(12) United States Patent
Davis et al.

(10) Patent No.: US 12,444,915 B2
(45) Date of Patent: Oct. 14, 2025

(54) MANAGEMENT DEVICE FOR HYBRID CABLE

(71) Applicant: CommScope Technologies LLC, Hickory, NC (US)

(72) Inventors: Ronna Ellen Davis, Henderson, NV (US); Scott Martin Keith, Plano, TX (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 240 days.

(21) Appl. No.: 18/160,762

(22) Filed: Jan. 27, 2023

(65) Prior Publication Data

US 2023/0261452 A1    Aug. 17, 2023

Related U.S. Application Data

(63) Continuation of application No. PCT/US2021/043518, filed on Jul. 28, 2021.

(60) Provisional application No. 63/224,563, filed on Jul. 22, 2021, provisional application No. 63/057,384, filed on Jul. 28, 2020.

(51) Int. Cl.
*H02G 3/08*     (2006.01)
*G02B 6/44*     (2006.01)

(52) U.S. Cl.
CPC .......... *H02G 3/081* (2013.01); *G02B 6/4446* (2013.01); *G02B 6/4457* (2013.01); *H02G 3/085* (2013.01)

(58) Field of Classification Search
CPC .......... H02G 3/081; H02G 3/08; H02G 3/085; H02G 3/0437; H02G 3/0481; H02G 3/32; H02G 3/30; H02G 3/02; H02G 3/04; H02G 3/0406; H02G 3/06; H02G 3/36;
(Continued)

(56) References Cited

U.S. PATENT DOCUMENTS 6,591,053 B2 *   7/2003  Fritz ................. G02B 6/44524
                                                        385/135
7,496,269 B1 *   2/2009  Lee ..................... G02B 6/4452
                                                        385/134
(Continued)

FOREIGN PATENT DOCUMENTS

KR      2011218431 Y1    4/2001
KR       200265249 Y1    2/2002
(Continued)

OTHER PUBLICATIONS

Extended European Search Report for Application No. 21850699.6 mailed Jul. 22, 2024.
(Continued)

*Primary Examiner* — Angel R Estrada
(74) *Attorney, Agent, or Firm* — MERCHANT & GOULD P.C.

(57) ABSTRACT

An enclosure includes a management insert disposed within a housing to divide the interior into three levels. Hybrid cables enter the housing at the first level. Electrical conductors of the hybrid cables are terminated at the second level. Optical fibers of the hybrid cables are terminated at the third level. Excess length of the optical fibers may be stored at the third level. The management insert may be fastened to the housing using plugs received at select ones of the cable entrance/exit locations. A dedicated furcation enclosure is also disclosed.

15 Claims, 22 Drawing Sheets

(58) Field of Classification Search
CPC .... G02B 6/446; G02B 6/4457; G02B 6/4452; G02B 6/4478; G02B 6/4471; G02B 6/4477
USPC .......... 174/50, 68.1, 68.3, 135, 72 A, 72 R; 248/56, 68.1; 385/134, 135; 52/220.1, 52/220.7
See application file for complete search history.

(56) References Cited

U.S. PATENT DOCUMENTS

| | | | | |
|---|---|---|---|---|
| 8,135,256 | B2 * | 3/2012 | Solheid | G02B 6/4452 385/135 |
| 9,084,367 | B2 * | 7/2015 | Hawley | H05K 7/186 |
| 9,547,145 | B2 * | 1/2017 | Cox | G02B 6/4452 |
| 9,612,416 | B2 * | 4/2017 | Ray | B01J 29/7088 |
| 10,935,744 | B2 * | 3/2021 | Coan | H02G 3/08 |
| 2009/0202214 | A1 | 8/2009 | Holmberg et al. | |
| 2011/0317971 | A1 | 12/2011 | Zhang et al. | |
| 2020/0192042 | A1 | 6/2020 | Coan et al. | |

FOREIGN PATENT DOCUMENTS

| | | |
|---|---|---|
| KR | 1020130022045 A1 | 3/2013 |
| KR | 10-2017-0004202 A | 1/2017 |
| KR | 20170102650 A | 9/2017 |
| WO | 2016006858 A1 | 1/2016 |

OTHER PUBLICATIONS

International Search Report for International Patent Application No. PCT/US2021/043518 mailed Nov. 18, 2021.

* cited by examiner

FIG. 26
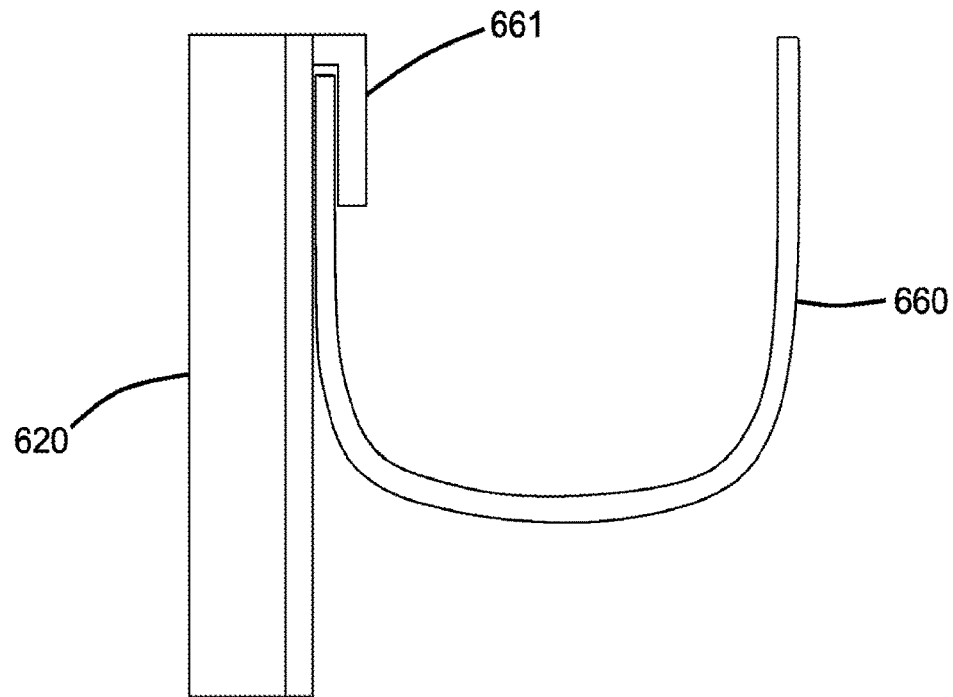
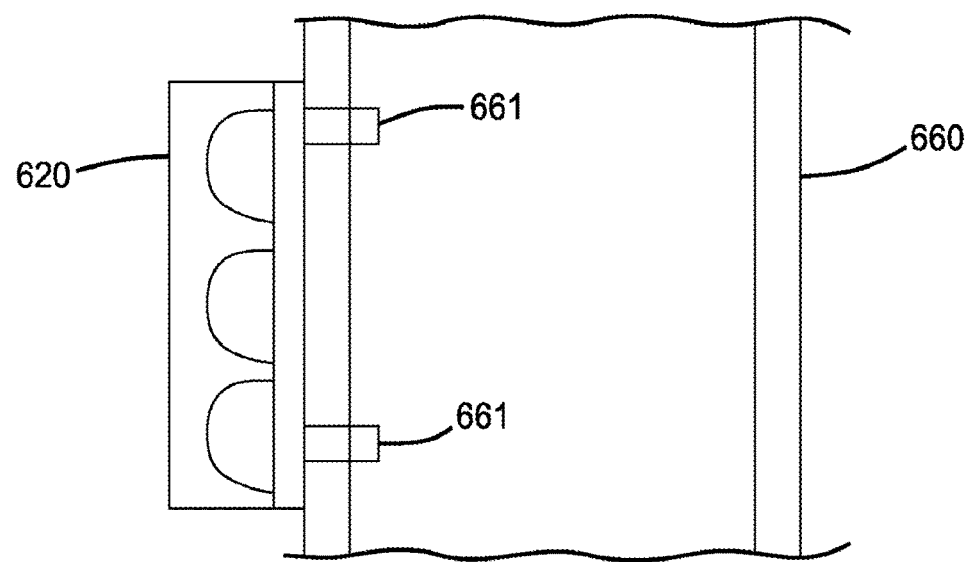
FIG. 27

MANAGEMENT DEVICE FOR HYBRID CABLE

CROSS-REFERENCE TO RELATED APPLICATIONS

This application is being filed as a Continuation of PCT International Patent Application PCT/US2021/043518, filed on 28 Jul. 2021, and claims the benefit of U.S. Patent Application Ser. Nos. 63/057,384, filed on Jul. 28, 2020, and 63/224,563, filed Jul. 22, 2021, the disclosures of which are incorporated herein by reference in their entireties.

TECHNICAL FIELD

The present disclosure relates generally to devices such as enclosures for managing termination and/or transition locations for hybrid cable.

BACKGROUND

In the telecommunication industry, hybrid cable is typically cable that includes both optical fibers and electrical conductors. The optical fibers are adapted for transmitting optical communication signals while the electrical conductors are used to conduct electrical power and/or electrical communication signals. Often, hybrid cables have a construction that combines multiple optical fibers, for high data rate communication, with electrical conductors (e.g., copper conductors) for power delivery. Terminating and managing this type of hybrid cable offers unique challenges because of the differences between how optical fibers and electrical conductors should be managed and connected. An example enclosure for use with hybrid cable is disclosed in U.S. Pat. No. 9,977,208.

SUMMARY

Aspects of the present disclosure relate to devices such as enclosures for managing and protecting transition locations (e.g., furcation locations) and/or termination locations for hybrid cables. Furcation locations can also be referred to as dividing locations, break-out locations and separating locations.

Aspects of the present disclosure relate to an apparatus capable of effectively providing a transition point for indoor to outdoor hybrid cable, and/or a termination point for hybrid cable awaiting future device installations.

In certain examples, the apparatus can be plenum rated. In certain examples, the apparatus includes a management insert that is capable of being mounted in a housing such as an off-the-shelf National Electrical Manufacturers Association (NEMA) rated box (e.g., Type 1 rated).

In certain examples, the management insert can include a deck providing a stable platform at which an electrical power termination location (e.g., a power terminal block/strip), a dematable fiber optic connection location (e.g., a fiber optic adapter module), and a fiber management structure (e.g., a fiber management spool) can be supported. In certain examples, the deck can provide vertical separation for the different media types to facilitate separate handling of the different media types at different levels.

In one example, cable entrance locations and optical fiber/electrical conductor separation (e.g., cable break-out locations) can be provided at a first level of the enclosure, electrical conductors broken out from the hybrid cable can be electrically connected to an electrical conductor connection location located at a second level, and optical fibers broken out from the hybrid cable can be connectorized (e.g., with optical connectors such as LC connectors, SC connectors, MPO connectors, or the like) which are plugged into ports of fiber optic adapters (e.g., which may be integrated as part of an adapter module) located at a third level. In certain examples, fiber management such as fiber overlength storage can be provided by structure such as a fiber management spool at the third level. In this manner, three separate levels are provided for separating and providing enhanced access to the optical fibers and the electrical conductors. In certain examples, the separation assists in protecting the optical fibers while the power conductors, which are typically more rigid, are being terminated.

In certain examples, the management insert can be secured within a housing by using existing conduit knock-outs in the sidewalls of the housing.

Aspects of the present disclosure also relate to enclosures for protecting and concealing furcation locations (e.g., bifurcation locations) for hybrid cables. In one example, such enclosures provide a covered furcation function without providing additional termination functionality such as optical splicing, connectorized dematable optical or electrical interconnections or the like. In certain examples, such enclosures can be used in telecommunications rooms of buildings and can be wall mounted, cable trough mounted, rack mounted, or cable runway mounted.

Aspects of the present disclosure relate to a dedicated furcation enclosure for separating first and second types of transmission lines of a hybrid cable. The enclosure includes a base (e.g., a back plate) and a divider attached to the base. The enclosure also includes a front cover that mounts to the base. The front cover defines an entrance opening and first and second exit openings. The hybrid cable is routed into the enclosure through the entrance opening and the first and second types of transmission lines are separated from each other at the divider. After separation at the divider, the first transmission lines are routed out of the enclosure through the first exit opening and the second transmission lines are routed through the second exit opening. In one example, the dedicated furcation enclosure has a dedicated furcation function and no termination functionality occurs within the dedicated furcation enclosure. In one example, the enclosure is adapted to be mounted to a structure (e.g., a wall, a rack, a cable trough, a cable runway, etc.) within a telecommunications room of a building. In one example, the first and second exit openings can be subdivided to assist in identifying (e.g., designating, labeling, marking) transmission lines (e.g., identify transmission lines based on the cable from which they originate).

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 26 shows the furcation enclosure of FIG. 23 equipped with a mounting flange for mounting the enclosure to the side of a cable trough used for routing cables in a telecommunications room;

FIG. 27 is a top view of the enclosure of FIG. 26 shown mounted to the cable trough;

DETAILED DESCRIPTION

Figure 1:
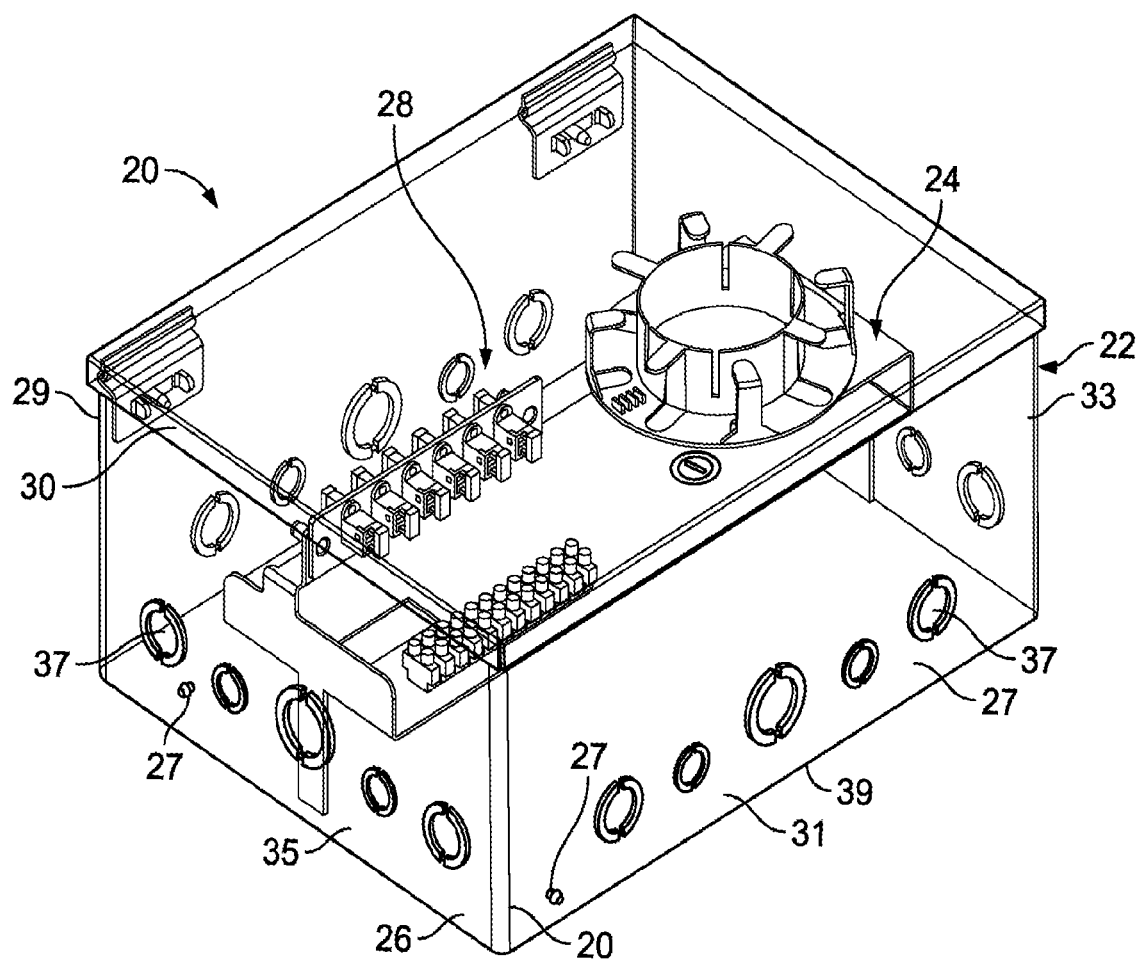
FIG. 1 depicts an enclosure device in accordance with the principles of the present disclosure including a housing containing an internal management device adapted for managing both optical fibers and electrical conductors.
Figure 2:
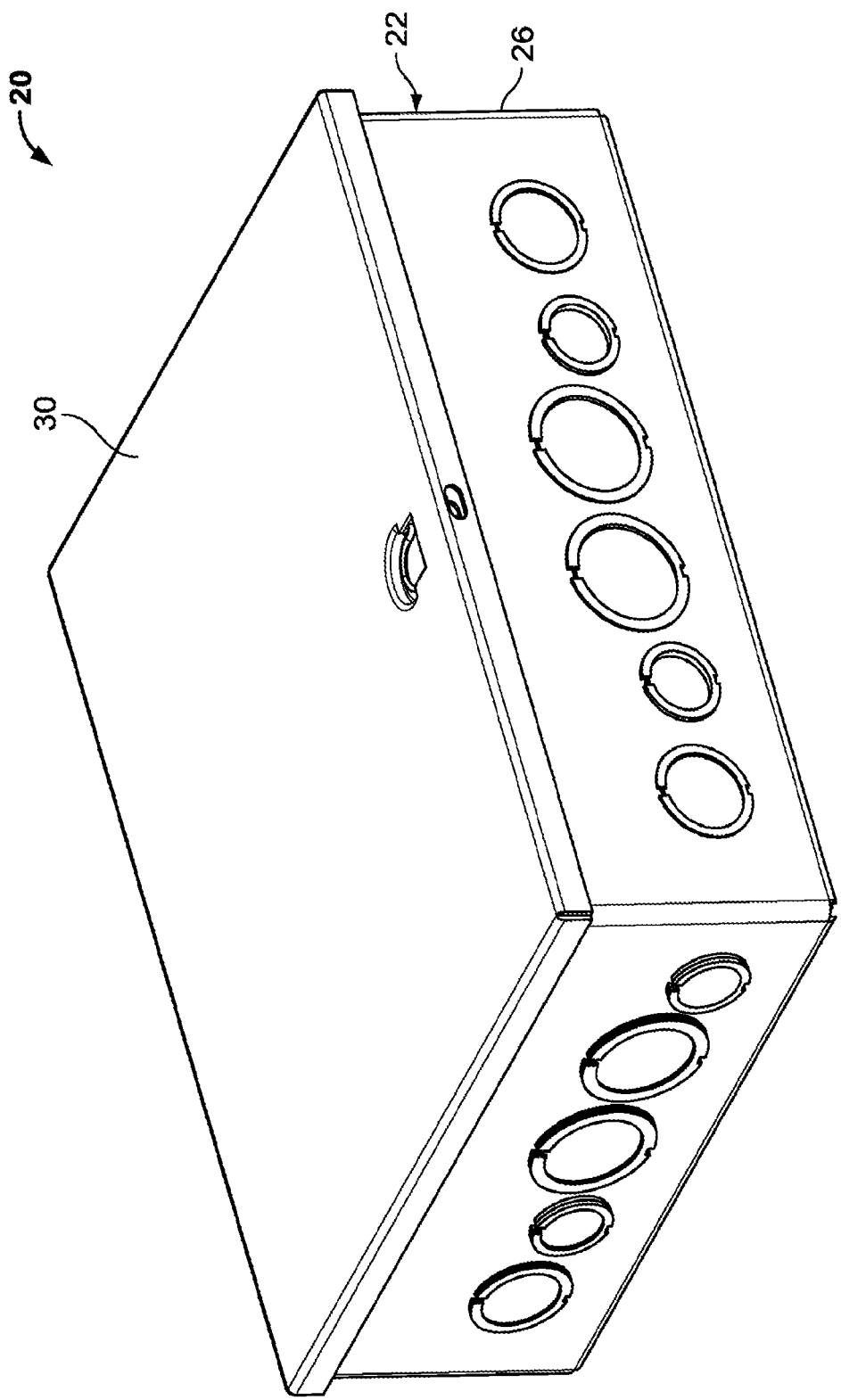
FIG. 2 is a perspective view of the housing of the enclosure device of FIG. 1.
Figure 3:
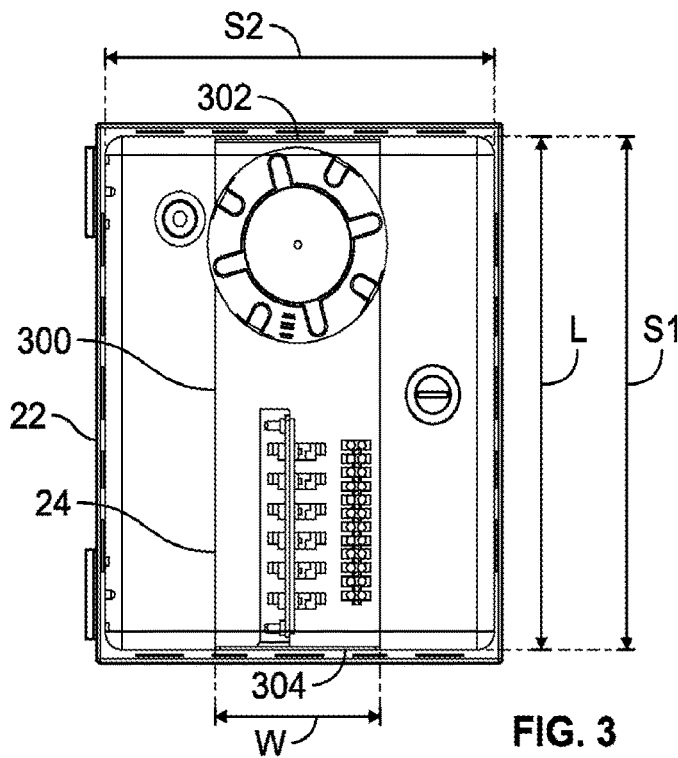
FIG. 3 is a front view of the enclosure device of FIG. 1 with the housing shown in phantom line.
Figure 4:
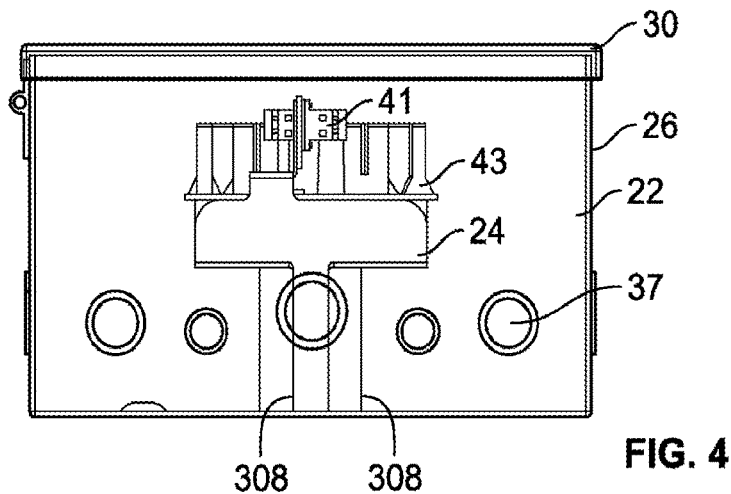
FIG. 4 is an end view of the enclosure device of FIG. 1 with the housing shown in phantom line.
Figure 5:
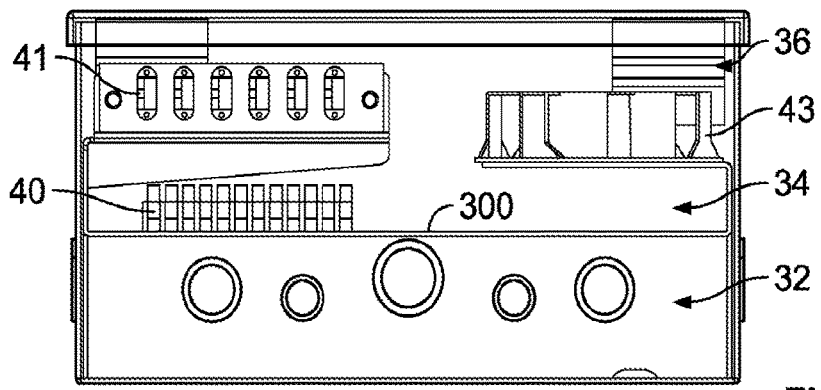
FIG. 5 is a side view of the enclosure device of FIG. 1 with the housing shown in phantom line.
Figure 6:
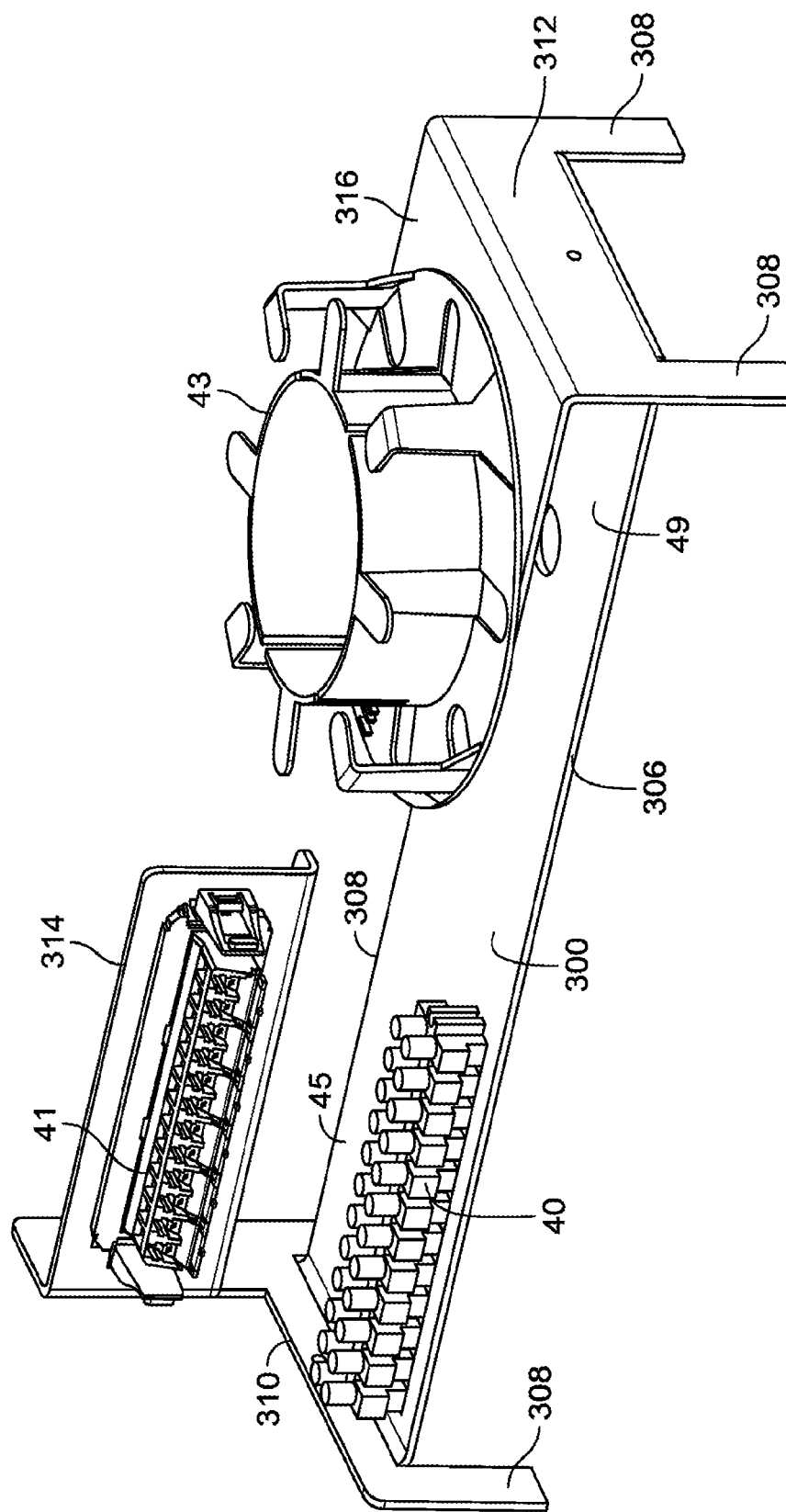
FIG. 6 is a perspective view of the management device of the enclosure device of FIG. 1.
Figure 7:
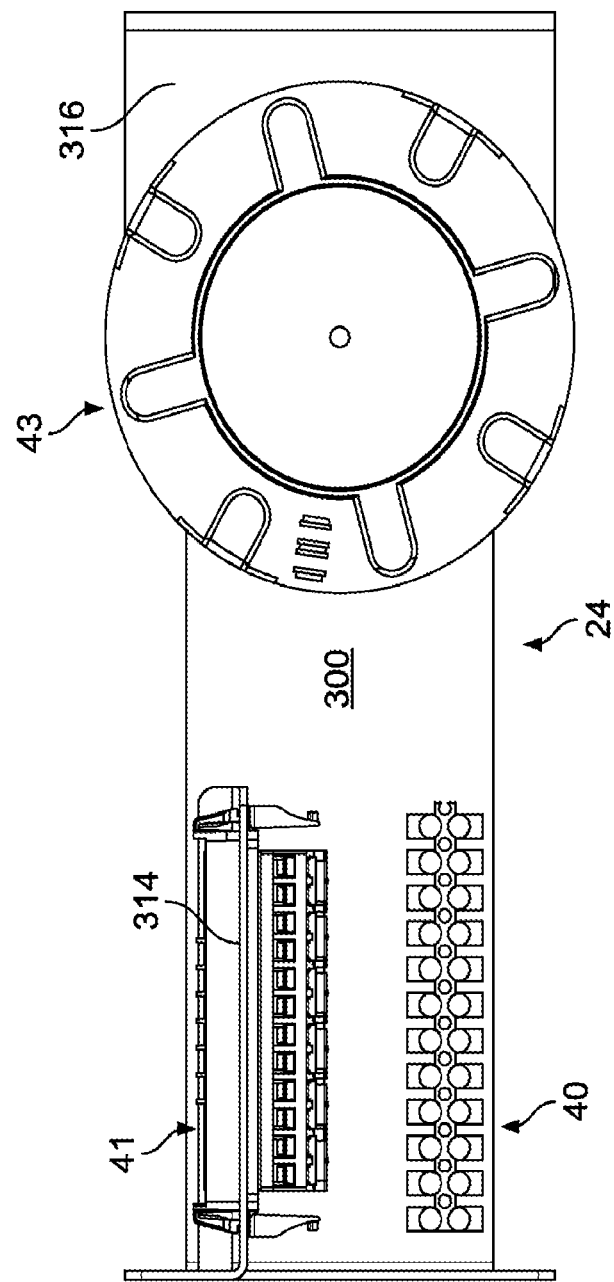
FIG. 7 is a front view of the management device of FIG. 6.
Figure 8:
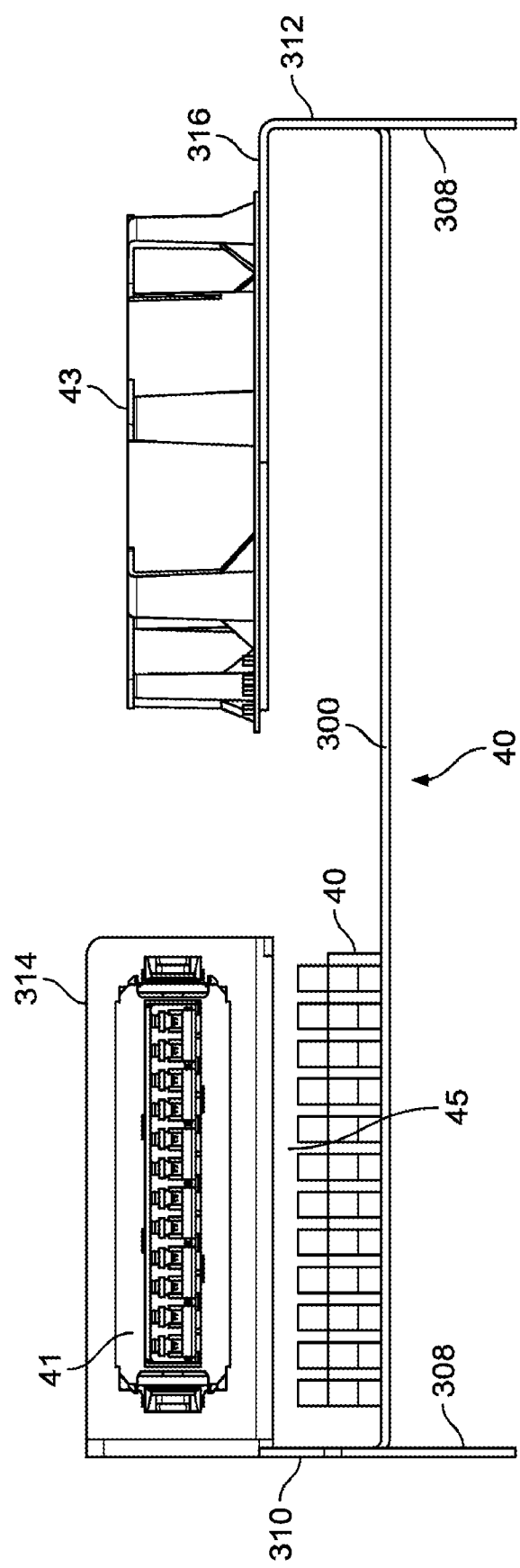
FIG. 8 is a side view of the management device of FIG. 6.

FIG. 1 depicts an enclosure device 20 in accordance with the principles of the present disclosure for managing optical and electrical connections between hybrid cables. In certain examples, the hybrid cables can include indoor hybrid cables and outdoor hybrid cables that are optically and electrically connected together within the enclosure device 20. In the depicted example, the enclosure device 20 includes a housing 22 containing a management device 24. In certain examples, the management device 24 can be an insert that mounts within the housing 22. In certain examples the management device 24 divides the housing into multiple levels (e.g., at least 3 levels) with each level providing a different functionality (e.g., cable break-out functionality; fiber optic connection functionality; electrical connection functionality).

Hybrid cables are typically understood to include both electrical transmission lines (e.g., copper transmission lines such as co-axial transmission lines, twisted pair transmission lines, copper power lines such as stranded or solid copper wires) and fiber optic transmission lines (e.g., single mode or multi-mode fiber). As used herein, a hybrid cable includes any type of cable having at least two different types of transmission lines (e.g., electrical and optical transmission lines, different types of electrical transmission lines, different types of optical transmission lines).

The housing 22 can include a main body 26 defining an interior 28 in which the management device 24 is mounted, and a cover 30. In certain examples, the cover 30 is mounted to the main body 26 at a front of the housing 22 and can be moved from a closed position to an open position to allow access to the interior 28 of the housing 22. In certain examples, the cover 30 is pivotally connected to the main body 26. In certain examples, the main body 26 includes a base 39 adapted for connection to a wall or other structure. The main body 26 also includes opposing top and bottom walls 33, 35 and opposing side walls 29, 31 that project forwardly from the base 39. In certain examples, the walls 29, 31, 33, 35 can include knock-outs 37 that can be removed from the walls to open cable access ports through which cables or portions of cables can be routed into the interior of the housing 22. In certain examples, the housing 22 is a National Electrical Manufacturers Association (NEMA) rated box (e.g., Type 1 rated). In the depicted example, the base defines fastener openings 27 adjacent the walls 29, 31, 33, 35 for receiving fasteners (e.g., screws, bolts, nails, etc.) used to secure the housing 22 to a structure such as a wall of a building.

Figure 11:
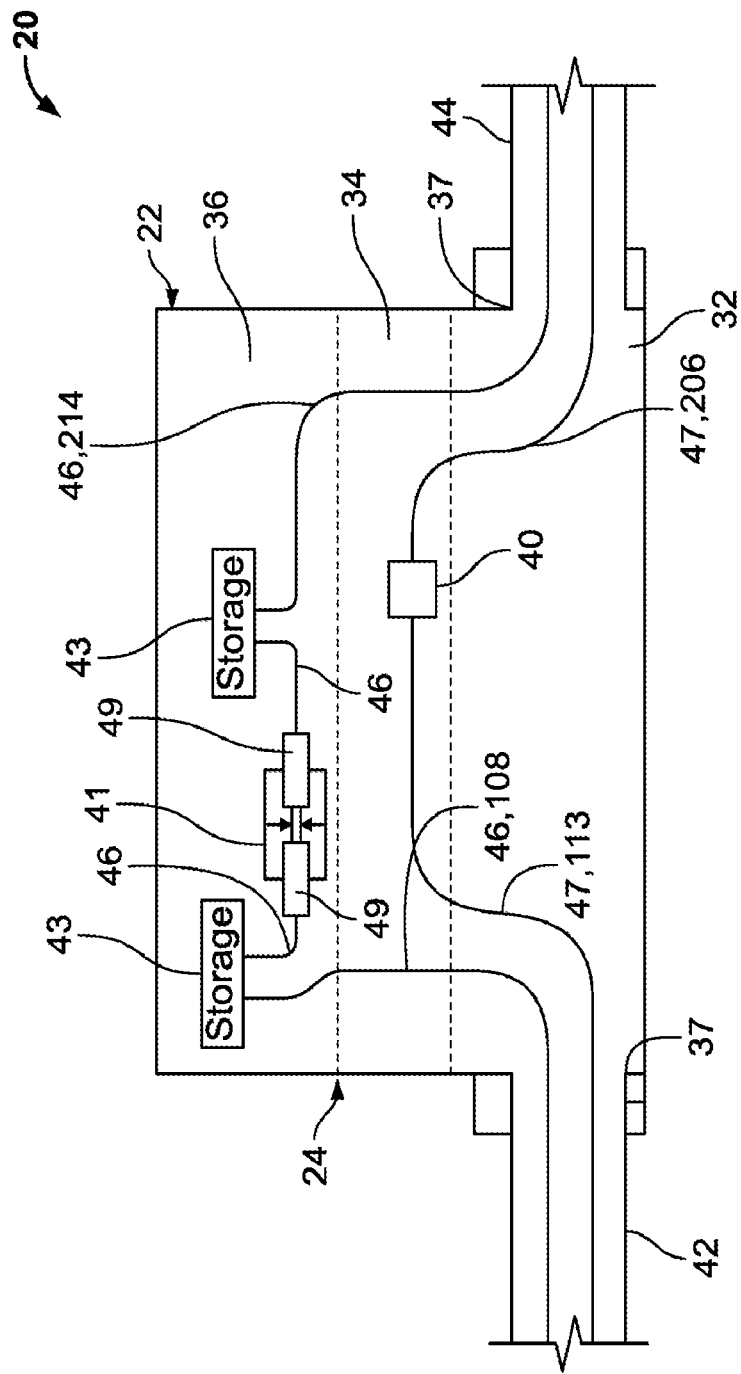
FIG. 11 is a schematic view showing an example layout and internal routing scheme for the enclosure device of FIG. 1.

Referring the schematic depiction of FIG. 11, the management device 24 can function to divide the housing 22 into a plurality of different levels such as a first level 32, a second level 34 and a third level 36. In the depicted example, the second level 34 is between the first level 32 and the third level 36. The first level 32 is adjacent the base 39 of the housing 22 while the third level 36 is positioned adjacent the openable front side of the housing 22.

As shown at FIG. 11, cable entrance/exit locations (e.g., knock-out locations 37) in the walls 29, 31, 33, 35 of the housing 22 are located at the first level 32. Each knock-out location 37 includes a knock-out piece that can be removed (e.g., knocked-out) from its corresponding wall to provide a cable access opening through the wall. Each knock-out piece is surrounded by a weakened, pre-defined break location for facilitating removing each knock-out piece from its corresponding wall. The first level 32 provides an open region for managing the separation of the optical fibers from the electrical conductors of hybrid cables routed through the cable entrance/exit locations.

The second level 34 is reserved for providing electrical connections between electrical conductors of the hybrid cables (e.g., between the electrical conductors of outdoor and indoor hybrid cables). Thus, the second level 34 can include an electrical conductor connection location 40, which may include an electrical termination block or blocks. Example electrical connection structures include insulation displacement contacts having blades that engage and electrically contact the electrical conductors or threaded electrical connection elements, such as screw-type electrical connectors, where electrical conductors, such as wires, are clamped down on metal parts by screws.

The third level 36 defined by the management device 24 is preferably reserved for managing optical fibers of the hybrid cables routed into the enclosure through the cable entrance/exit location at the first level 32. The third level 36 can include an optical connection location 41, which may provide for managing optical splices or can include structures for promoting dematable optical connections between optical fibers (e.g., fiber optic adapters that may be arranged in bank, and can include one or more adapted modules such as adapter blocks). The optical connections can be between optical fibers of indoor and outdoor hybrid cables. A fiber optic adapter is typically a structure having opposite ports for receiving fiber optic connectors such that optical fibers terminated by the fiber optic connectors are coupled together in co-axial alignment with each other. A fiber optic adapter for coupling together single fiber optical connectors often includes an internal ferrule alignment sleeve that receives and coaxially aligns ferrules of the fiber optic connectors being coupled together. Example fiber optic connectors can include LC and SC connectors. The fiber optic connectors are mounted at the ends of the optical fibers with the optical fibers having bare fiber portions secured within the ferrules of the fiber optic connectors.

The third level 36 can also include one or more fiber storage regions 43, such as spools, for providing storage of excess fiber length at the third level 36. The third level 36 is more readily accessible because it is positioned adjacent the openable side of the housing 22. By separating the electrical and fiber optic connection regions, the more delicate fibers are less likely to be damaged.

Referring to FIG. 11, an outdoor fiber optic cable 42 and an indoor fiber optic cable 44 are shown routed into the housing 22 through the knockouts at the first level 32. The cables can be optionally sealed relative to the housing by glands, heat shrink sleeves, gels, gaskets or other structures. In certain other examples, strength members (e.g., tensile reinforcing material such as reinforcing yarn (e.g., Aramid yarn), reinforcing members such as metal elements or fiber reinforced polymer rods, etc.) of the fiber optic cables can be anchored to the housing 22 by clamps, fasteners, adhesive, or other structures.

Each of the fiber optic cables 42, 44 are hybrid cables that can include a plurality of optical fibers 46 and a plurality of electrical conductors 47 (e.g., braided or solid conductors such as copper conductors). The electrical conductors 47 of the outdoor cable 42 are shown electrically connected to the electrical conductors 47 of the indoor cable 44 at the electrical conductor connection location 40 provided at the second level 34. The optical fibers 46 of the cables 42, 44 are shown terminated with fiber optic connectors 49 and are optically connected to one another at the dematable fiber optic connection location 41 provided at the third level 36. Excess length of the optical fibers 46 is stored at the storage location 43 (e.g., one or more spools) at the third level 36.

In certain examples, the optical fibers of the outdoor cable 42 and/or the indoor cable 44 are coated optical fibers having a core, a cladding layer, and a coating layer surrounding the cladding layer. In certain examples, the coated fibers can be broken out from the cables and up-jacketed with furcation tube to provide further protection within the housing 22. In certain examples, the optical fibers of the outdoor cable 42 and/or indoor fiber optic cable 44 are buffered optical fibers in which the core and the cladding are protected by a coating layer as well as a buffered layer around the coating layer. Typically, a coating layer has an outer diameter of about 200-260 microns while a buffer layer generally has an outer diameter in a range of 500-950 microns. In certain examples, the fiber optic connectors can be directly terminated at the ends of the optical fibers (e.g., field terminated or factory terminated) of the indoor cable and/or the outdoor cable. In certain examples, the fiber optic connectors can be part of fiber optic pigtails that are spliced to the ends of the optical fibers of the indoor cable and/or the outdoor cable. Each pigtail can include a length of optical fiber having a first end adapted to be spliced to one of the optical fibers of a cable and a second end at which a fiber optic connector has been factory terminated.

Figure 14:
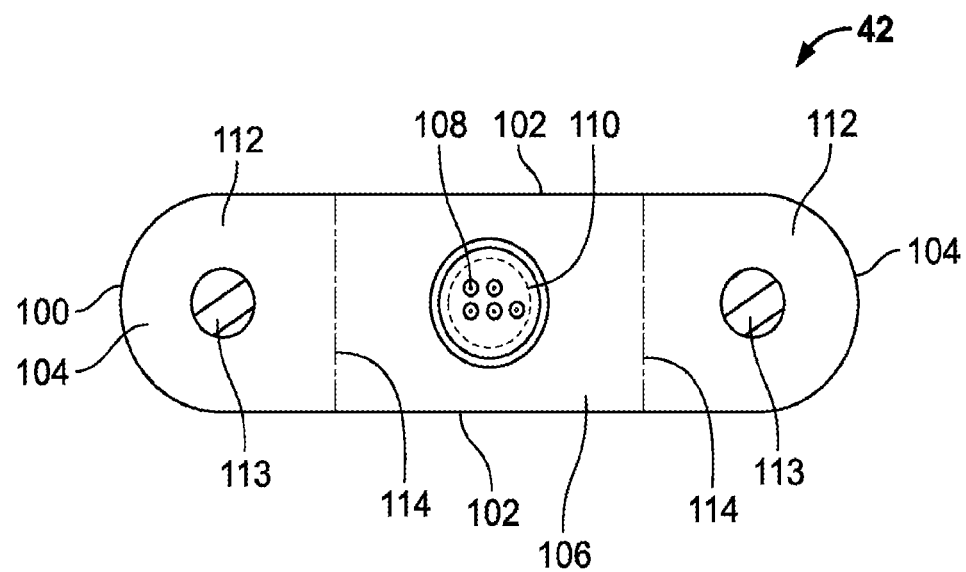
FIG. 14 depicts an example outdoor hybrid cable.

Referring to FIG. 14, in one example, the outdoor hybrid cable 42 incudes a cable jacket 100 having a generally flat configuration with a cross-sectional shape having opposite major sides 102 that extend between opposite rounded ends 104. The jacket 100 includes a central section 106 containing optical fibers 108 (e.g., coated, unbuffered optical fibers) and optionally a layer of reinforcing elements 110 (e.g., yarns such as Aramid yarns). The central section 106 is positioned between two end sections 112 of the jacket 100. Each end section 112 includes an electrical conductor 113 such as a solid or braided copper conductor. Tear regions 114 are provided between the central section 106 and the end sections 112 for allowing the end sections 112 to be separated from the central section 106.

Figure 15:
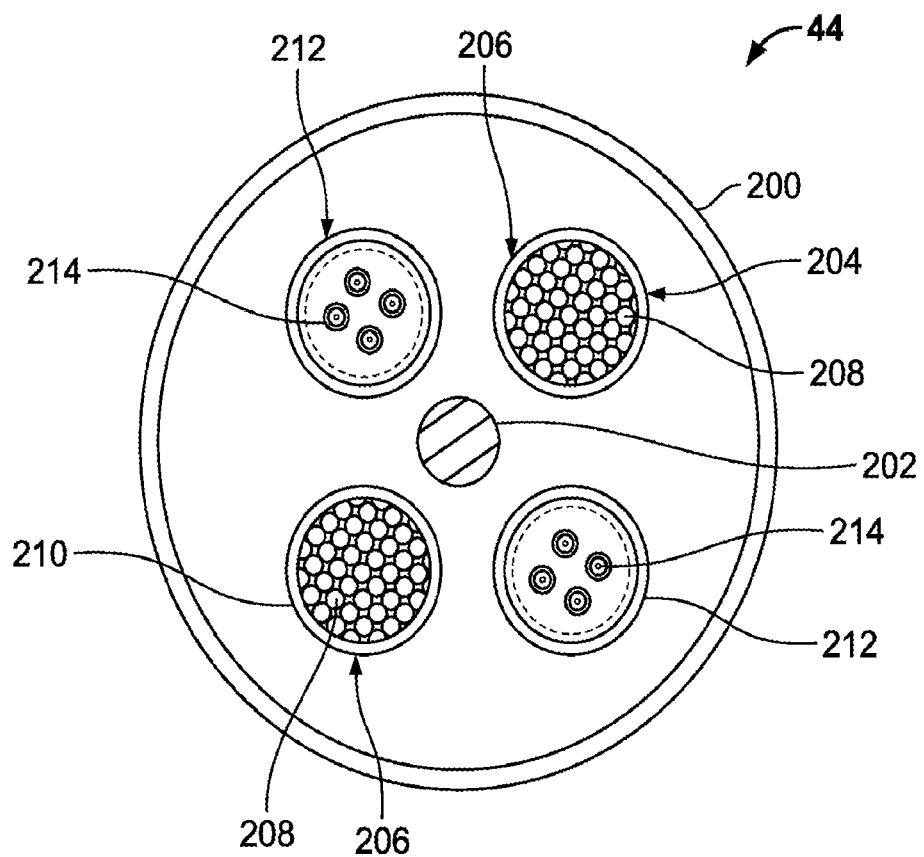
FIG. 15 depicts an example indoor hybrid cable.

Referring to FIG. 15, in one example, the indoor hybrid cable 44 includes a round cable jacket 200 containing a central strength member 202 (e.g., a fiber reinforced polymer rod). The cable 44 also includes a core 204 that is helically wound about the central strength member 202. The core 204 includes electrical wires 206 each including an electrical conductor 208 surrounded by an insulator 210. The core also includes loose tubes 212 containing buffered optical fibers 214. The loose tubes 212 also can contain a layer of reinforcing element (e.g., yarns such as Aramid yarns).

Referring to FIGS. 1 and 3-8, the management device 24 includes a main deck 300 having a length L that extends between opposite first and second ends 302, 304 of the main deck 300. In the depicted example, the length L is sized to extend substantially or fully across a spacing S1 defined between the top and bottom walls 33, 35 of the housing 22. In certain examples, the length L of the main deck 300 is adjustable to be compatible with various housing sizes. For example, the main deck 300 may telescopically expand and retract to adjust the length L (e.g., see FIG. 10). The main deck 300 also includes a width W that extends between opposite first and second edges 306, 308 of the main deck 300. In the depicted example, the width W is smaller than a spacing S2 between the opposite side walls 29, 31 of the housing 22 such that front access to the fastener openings 27 in the base 39 is not encumbered. In one example, the width W is less than or equal to one half the spacing S2.

The management device 24 includes spacers, such as legs 308, that space the main deck 300 forwardly from the base 39 such that the deck 300 is positioned at an intermediate location along a depth of the housing 22. The legs 308 can be unitary with the main deck 300 and can be positioned at the opposite ends 302, 304 of the main deck 300. In certain implementations, the legs 308 can be fastened to the housing 22 to secure the management device 24 within the main housing body 26.

Figure 9:
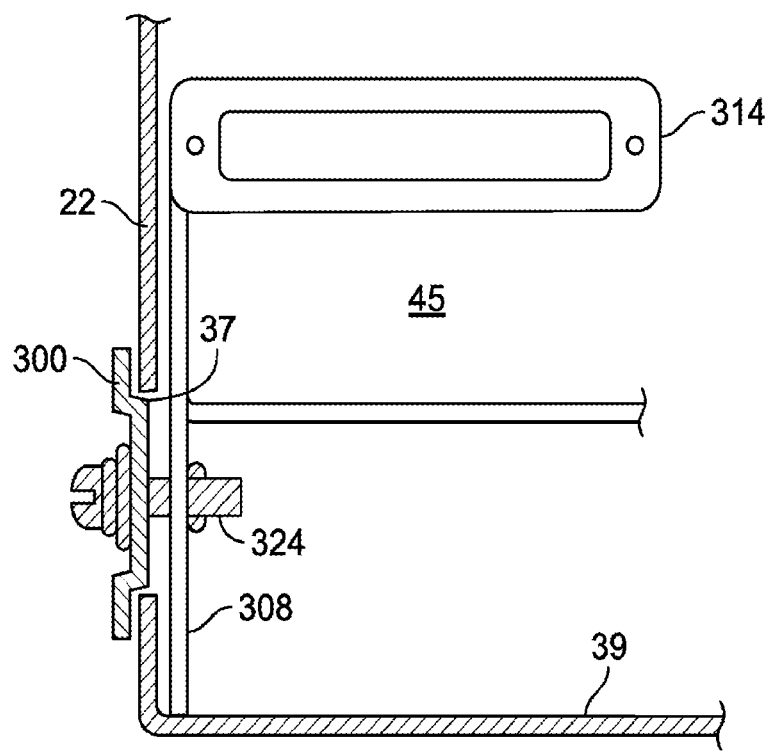
FIG. 9 is a cross-sectional view depicting an example configuration for securing the management device of FIG. 1 to the housing of FIG. 1.
Figure 10:
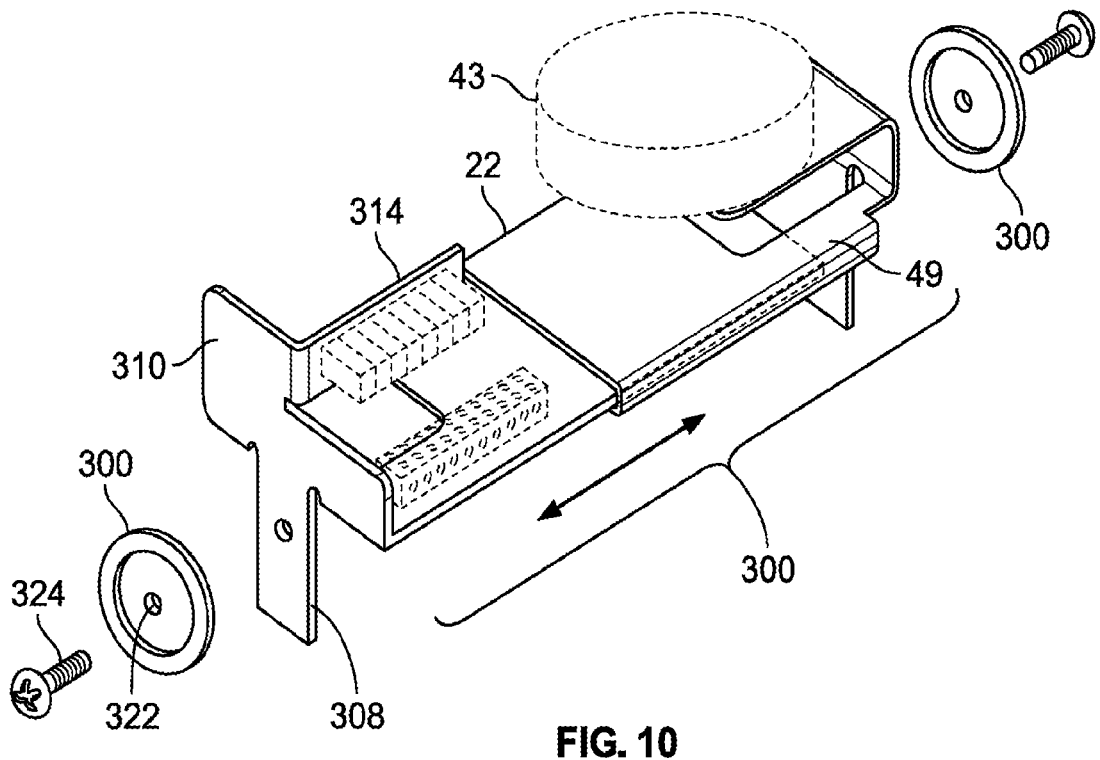
FIG. 10 is a perspective view of an alternate management device in accordance with the principles of the present disclosure that can be secured within the housing of FIG. 1.

As shown in FIGS. 9 and 10, a cap 320, such as a self-centering plug, can be received at one of the knock-out locations 37 defined through the housing 22. In the depicted example, the caps 320 are positioned at the top and bottom walls 33, 35. In other examples, the caps 320 can be positioned at the side walls 31, 33 of the main housing body 26, in certain examples, each cap 320 includes an outer rim that inhibits the cap 320 from passing through the knock-out location 37 and into the housing 22 (e.g., see FIG. 9). Each cap 320 defines a fastener opening 322 that aligns with a fastener opening defined through a respective one of the legs 308 or end walls of the management device 24. A fastener 324 is inserted through the fastener openings 322 of the cap 320 and the leg 308 to hold the management device 24 to the housing 22. In certain examples, the fasteners can be bolts threaded within threaded openings defined by the legs 308 or end walls 310, 312. Nuts can be provided at an opposite side of the legs 308 to secure the fastener 324 to the management device 24.

The management device 24 can include end walls 310, 312 (see FIG. 6) at the opposite ends 302, 304 that project upwardly from the deck 300. An adapter mounting member 314 (e.g., a bracket, plate, cantilever, etc.) can project from the end wall 310 over the main deck 300. In one example, the mounting member 314 has a cantilevered configuration with a base end integral with the end wall 310. The fiber optic adapters of the optical connection location 41 can be mounted at the adapter mounting member 314 at a level spaced forwardly from the deck 300. As depicted, the adapters are arranged in a row that extends along the length L of the main deck 300 and axes of the ports of the adapters extend along the width W of the deck 300.

An open space 45 is provided between the adapter mounting member 314 and the deck 300 for allowing electrical conductors to be routed between the deck 300 and the adapter mounting member 314 to the electrical conductor connection location 40. The electrical conductor connection location 40, depicted as an electrical termination block, is mounted directly at a top side of the deck 300 at a level lower than the fiber optic adapters. In the depicted example, the electrical conductor connection location 40 and the optical fiber connection location 41 are both positioned adjacent the same end 302 of the deck 300. In other examples, the connection locations 40, 41 can be positioned at opposite ends 302, 304 of the deck 300.

A spool mount 316 projects from the end wall 312 over the main deck 300. Open routing space 49 is provided beneath the spool mount 316 between the deck 300 and the spool mount 316. A spool for storing optical fiber is mounted at a top side of the spool mount 316.

Figure 12:
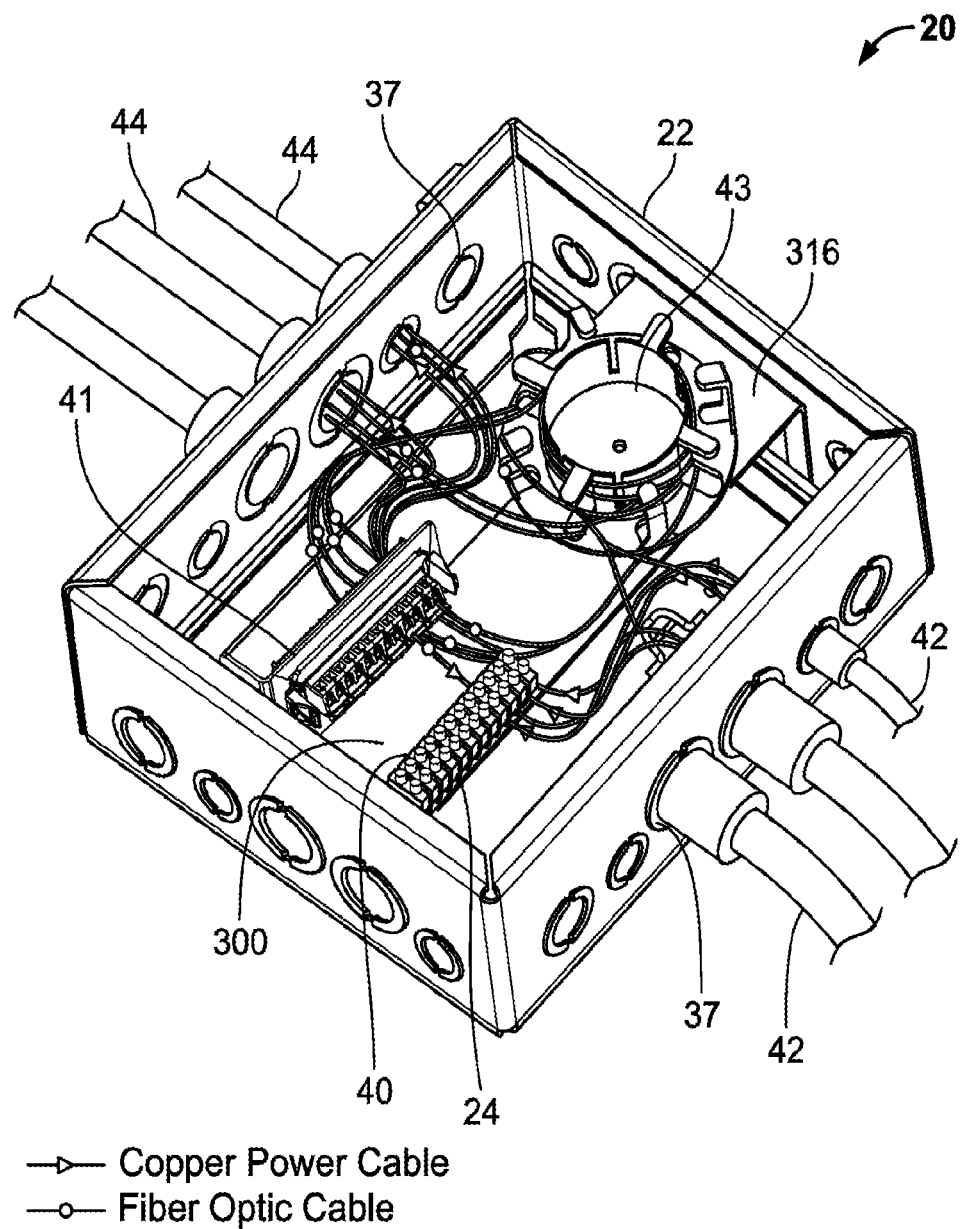
FIG. 12 shows an example optical fiber and electrical conductor routing scheme for the enclosure device of FIG. 1.
Figure 13:
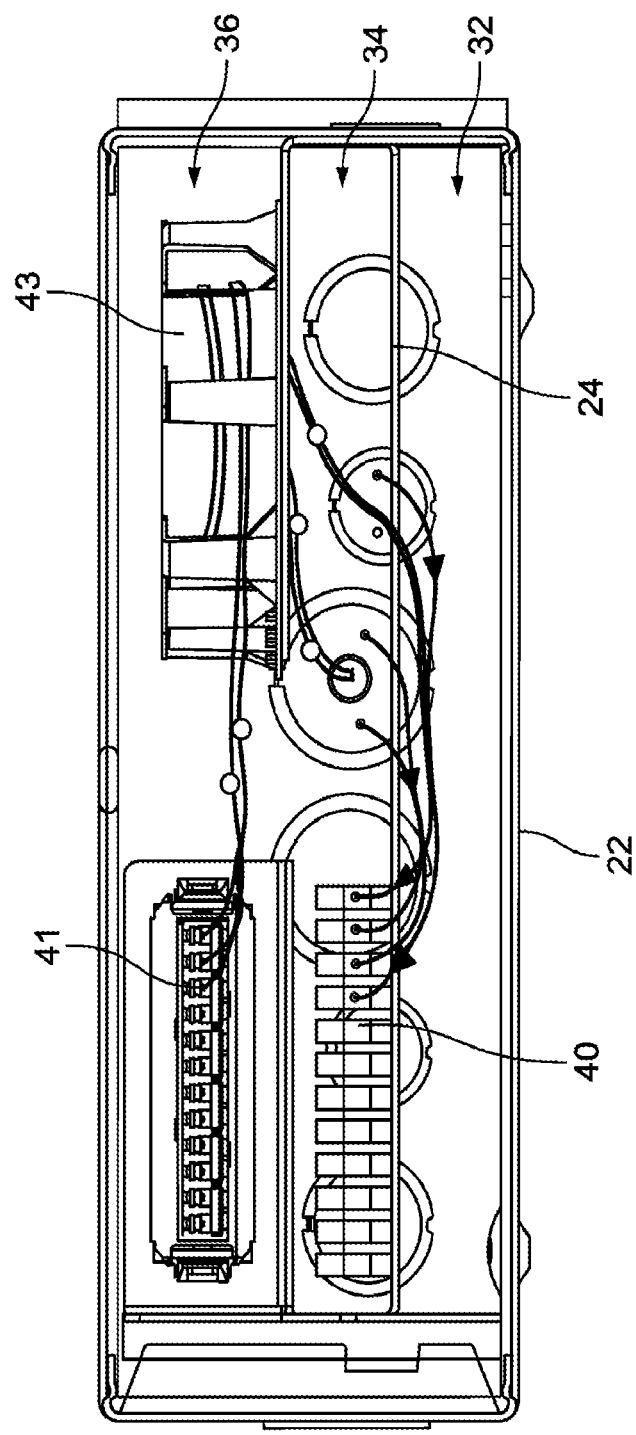
FIG. 13 is a further view showing the optical fiber and electrical conductor routing scheme of FIG. 12.

FIGS. 12 and 13 illustrate how the optical fibers and electrical conductors of the cables 42, 44 are routed within the housing 22. The cables 42, 44 enter the housing 22 through the knock-outs 37 at the first level 32 within the housing 22. Electrical conductors (see the lines labeled with triangles in FIGS. 12 and 13) of the cables 42, 44 are routed from the first level 32 to the second level 34. Ends of the electrical conductors are terminated at the electrical conductor connection location 40 to electrically connect the electrical conductors of cable 42 to the electrical conductors of cable 44.

Optical fibers (see the lines labeled with circles in FIGS. 12 and 13) of the cables 42, 44 are routed from the first level 32 to the third level 36. At the third level, ends of the optical fibers are plugged into adapter ports at the optical connection location 41 to optically couple the fibers of cable 42 to the fibers of cable 44. In certain examples, excess length of the optical fibers is stored at the fiber storage region 43 (e.g., at a spool disposed thereat). In the example shown, the fiber storage region 43 is disposed at the third level 36.

In some implementations, the management device 24 is configured to align the knock-outs 37 with the first level 32 so that all of the optical fibers and electrical conductors of the cables 42, 44 enter at the first level 32. However, in other implementations, one or more of the knock-outs 37 may at least partially align with the second level. FIG. 13 depicts a routing scheme showing the optical fiber cables entering at the second level 34 and extending directly to the third level 36. It will be understood that the electrical conductors also could enter at the second level 34. It will also be understood, however, that both the optical fibers and the electrical conductors may enter at the first level 32.

Figure 16:
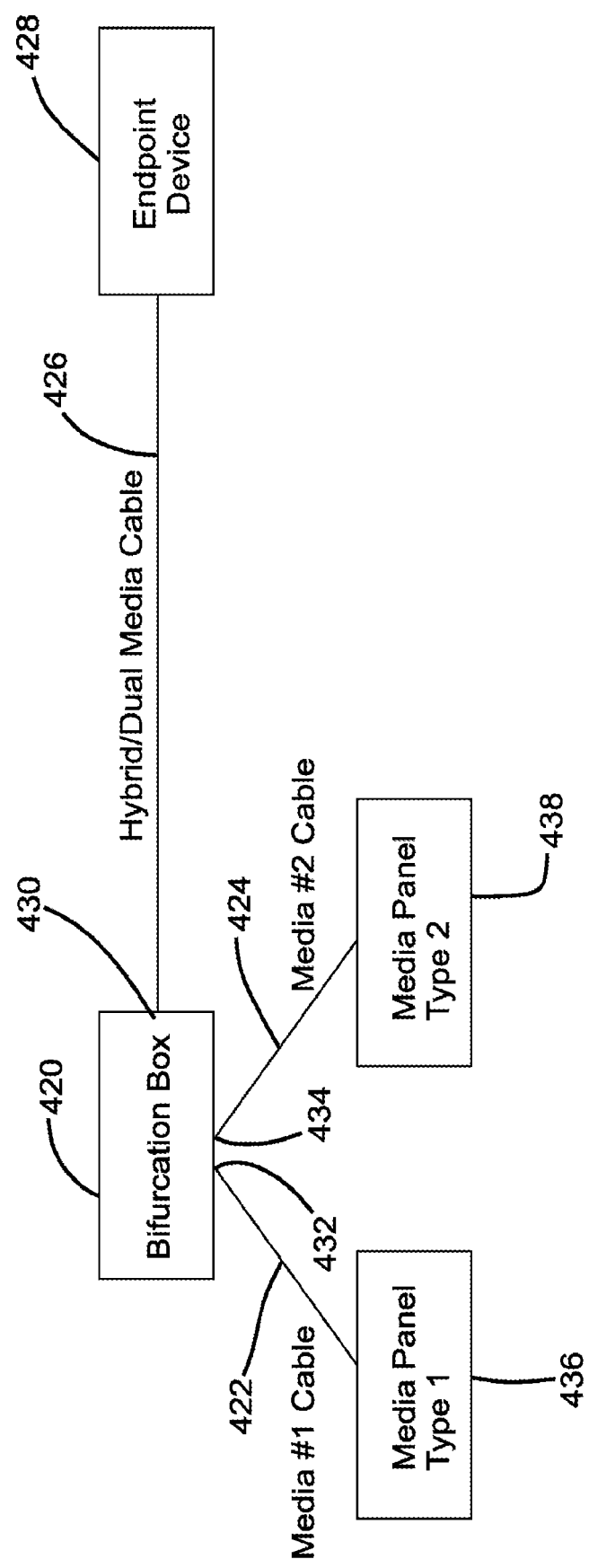
FIG. 16 is a schematic representation of a furcation system (e.g., a bifurcation system) in accordance with the principles of the present disclosure for separating different types of transmission lines (e.g., transmission lines corresponding to different media types) of a hybrid cable to facilitating routing of the different transmission lines to different equipment (e.g., different panels or racks)
Figure 17:
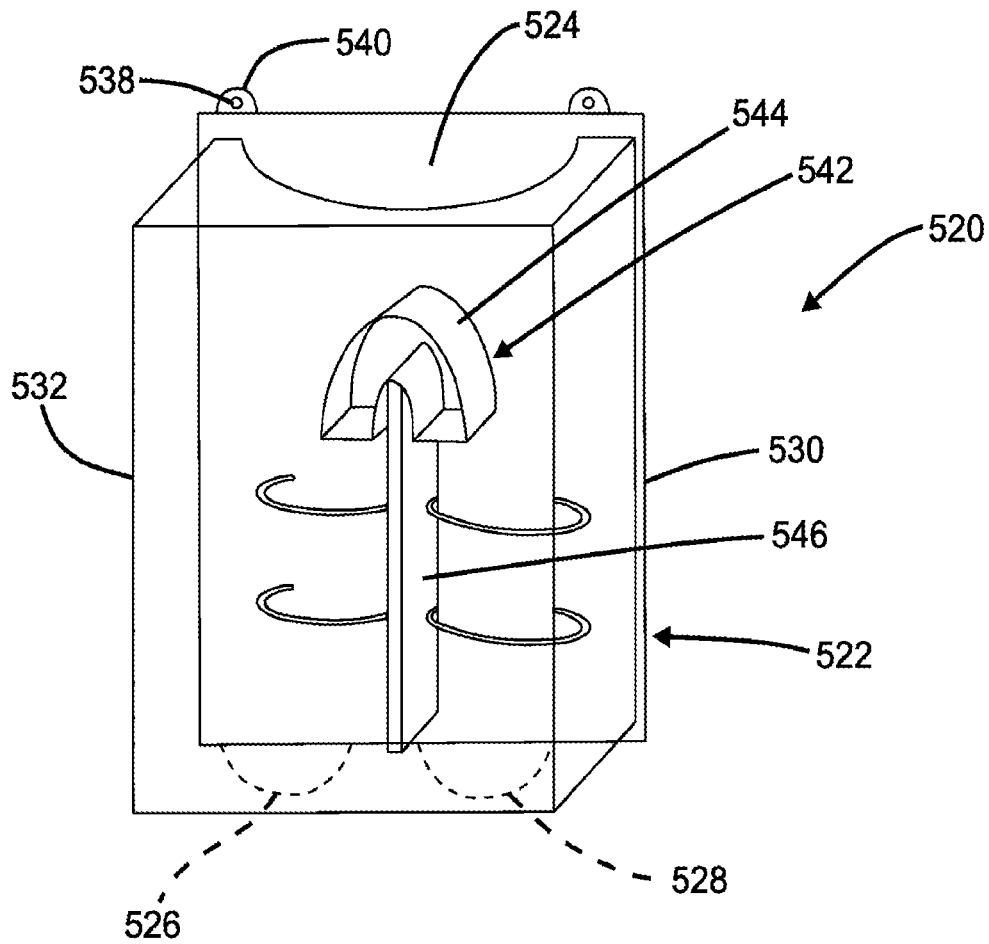
FIG. 17 is a perspective view of a furcation enclosure in accordance with the principles of the present disclosure.
Figure 18:
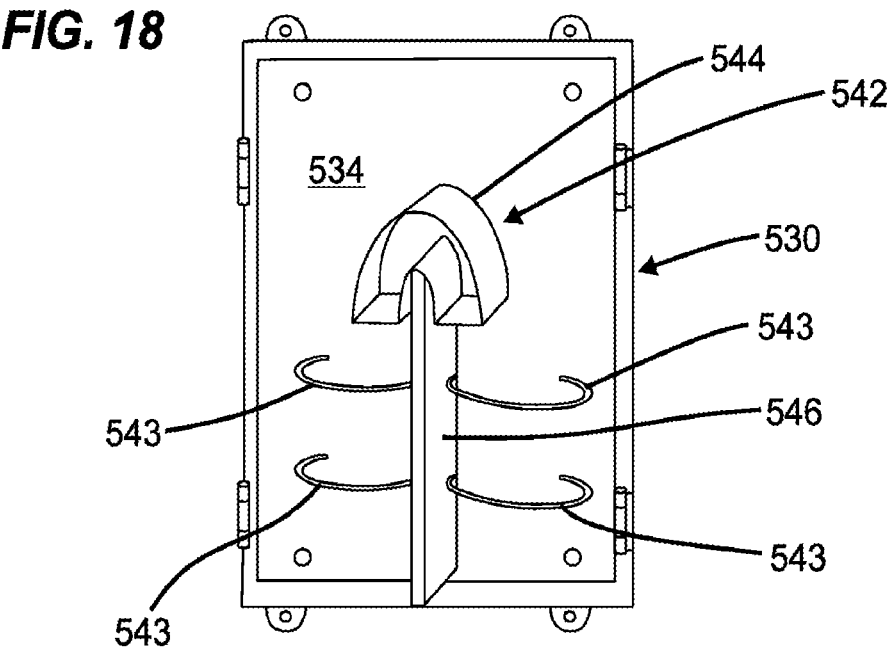
FIG. 18 depicts the furcation enclosure of FIG. 17 with a front cover of the enclosure removed.
Figure 19:
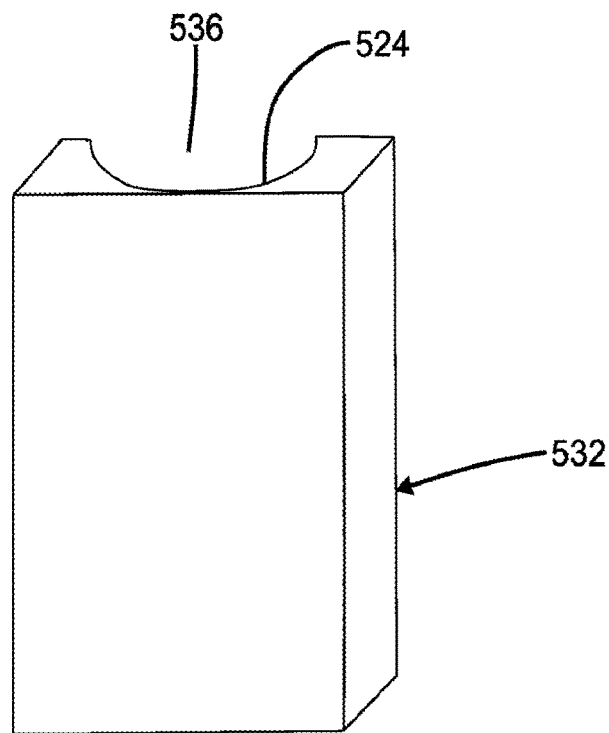
FIG. 19 is a first perspective view of the front cover of the furcation enclosure of FIG. 17.
Figure 20:
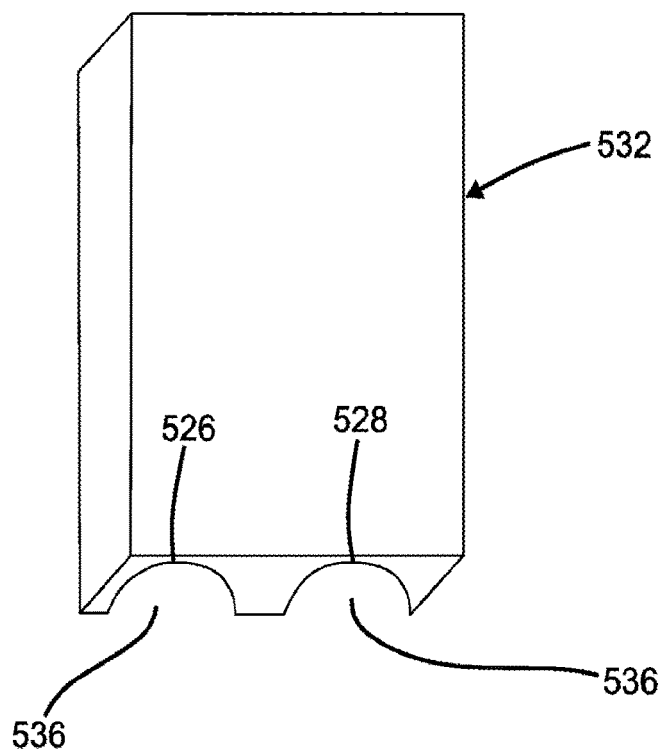
FIG. 20 is a second perspective view of the front cover of the furcation enclosure of FIG. 17.
Figure 21:
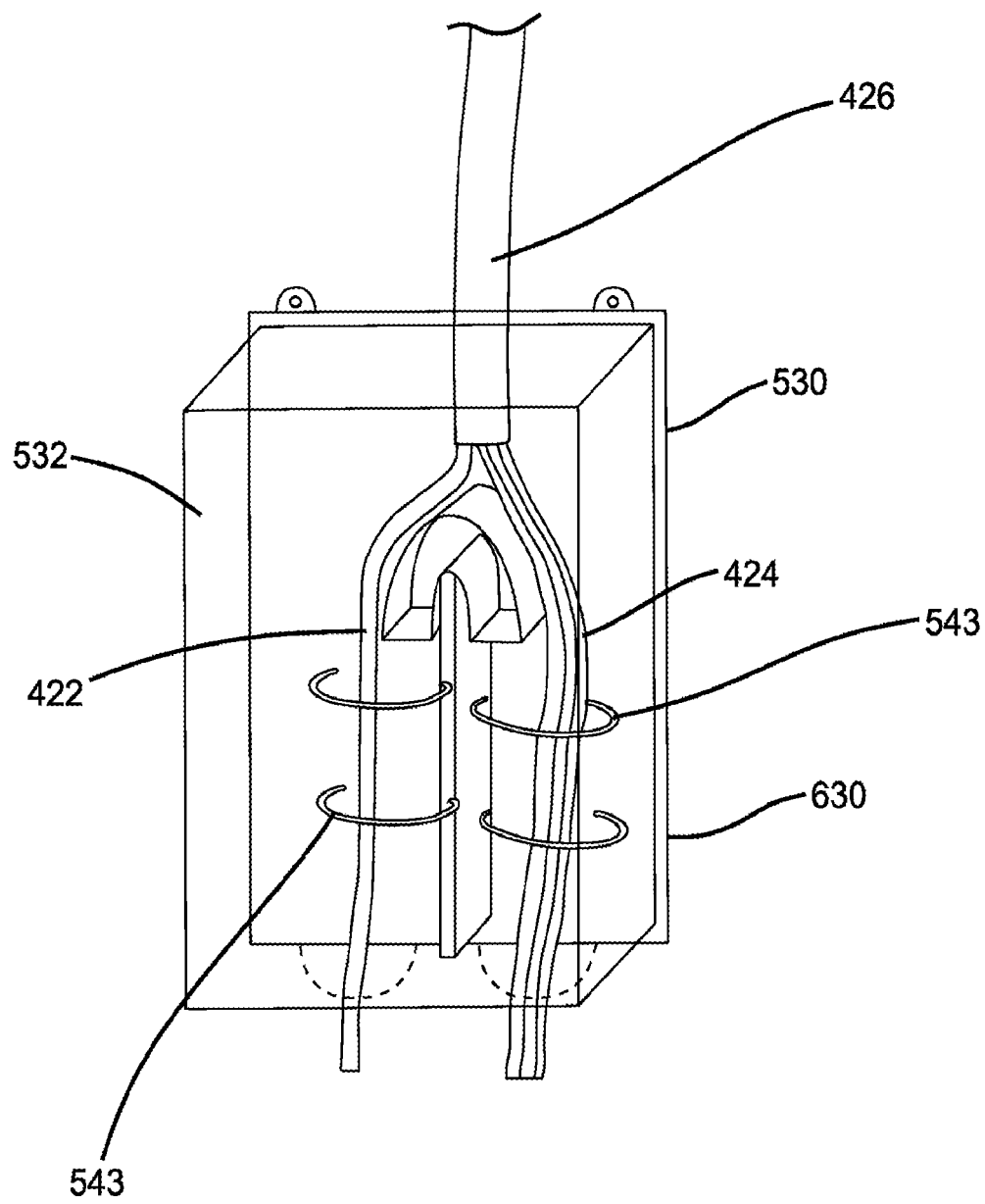
FIG. 21 shows the furcation enclosure of FIG. 17 with a hybrid cable routed through an entrance opening of the enclosure and with first and second different types of transmission lines separated from one another within the enclosure.

Aspects of the present disclosure also relate to enclosures for protecting and concealing furcation locations (e.g., bifurcation locations) for hybrid cables. For example, FIG. 16 schematically depicts an example furcation enclosure 420 in accordance with the principles of the present disclosure. In the depicted example, the enclosure 420 is a bifurcation enclosure used for separating first and second types of transmission lines 422, 424 of a hybrid cable 426. The hybrid cable 426 can be routed from an endpoint device 428 to an entrance location 430 of the enclosure 420. Within the enclosure 420, the first and second transmission lines 422, 424 can be separated from one another and routed out separate first and second exit openings 432, 434 of the enclosure 420. Once separated, the first and second transmission lines 422, 424 can be routed to separate pieces of equipment such as first and second media panels 436, 438 that may be provided on different racks. In the depicted example, the hybrid cable 426 includes the two different types of transmission lines which correspond to different media types. It will be appreciated that if more than two different types of transmission lines are provided within a given hybrid cable, a furcation enclosure in accordance with the principles of the present disclosure can have more than two exit openings with each exit opening corresponding to a different one of the types of transmission lines. Similarly, a dividing arrangement provided can be provided within the enclosure for separating more than two types of different transmission lines from one another.

In certain examples, furcation enclosures in accordance with the principles of the present disclosure can include functionality for dividing/separating different types of transmission lines from one another while protecting the transmission lines and providing an aesthetically pleasing appearance. In certain examples, such enclosures provide a covered furcation function without providing additional termination functionality such as optical splicing, connectorized dematable optical or electrical interconnections, or the like. In certain examples, such enclosures can be used in telecommunications rooms of buildings and can be wall mounted, cable trough mounted, rack mounted, or cable runway mounted.

FIGS. 17-21 depict an example furcation enclosure 520 in accordance with the principles of the present disclosure. In certain examples, the furcation enclosure 520 can be used for applications such as implementing the furcation enclosure 420 of FIG. 16. The furcation enclosure 520 includes a housing 522 including an entrance opening 524 for receiving a hybrid cable (e.g., hybrid cable 426) and first and second exit openings 526, 528 for respectively receiving first and second different types of transition lines (e.g., transition lines 422, 424) broken out from the hybrid cable within the housing 522. The housing 522 includes a base 530 and a front cover 532 that removably mounts to the base 530 and covers a front side 534 of the base 530. The front cover 532 cooperates with the base 530 to define the entrance opening 524, the first exit opening 526, and the second exit opening 528. Portions of the entrance opening 524, the first exit opening 526, and the second exit opening 528 defined by the front cover 532 have open rear sides 536 at the rear of the front cover 532 when the front cover 532 is disconnected from the base 530.

The base 530 is adapted to be connected to an external structure such as a wall, a rack, a trough, a runway, or other structure. In one example, the base 530 is adapted to be mounted to an external structure within a telecommunications room of a building. In one example, the base 530 can be secured to an external structure by fasteners (e.g., screws, bolts, clips, etc.) that extend through mounting openings 538 defined through a main body of the base 534 through mounting tabs 540 that project outwardly from the main body of the base 530. In other examples, the base 530 can include a mounting bracket, mounting hooks, strap receivers, or other arrangements for facilitating mounting the base 530 to an external structure. In certain examples, cable anchoring structures can be provided on the base 530 for securing the hybrid cable 526 to the base 530 adjacent the entrance opening 524. Example anchoring structures can include cable clamps, cable tie locations, and other structures for securing a jacketed end of the hybrid cable 526 to the base 530 or for securing strength members of the cable 526 to the base 530. The front cover 532 can be secured to the base 530 in a manner in which the front cover 532 is attached to the base 530 but also can be removed from the base to access the front side of the base 530. For example, the front cover 532 can be secured to the base 530 by a snap-fit connection, latches, clips, interlocks or other structures.

The enclosure 520 further includes an internal divider 542 at which the first and second types of transmission lines 422, 424 of the hybrid cable 426 are separated from one another to facilitate separately routing the first and second types of transmission lines 422, 424 to their respective first and second exit openings 432, 434. The internal divider 542 is provided at the front side 534 of the base 530 and is located within an interior of the housing 522 when the front cover 532 is mounted to the base 530. The internal divider 542 is preferably attached to the front side 534 of the base 530 so as to be carried with the base 530. In this way, the internal divider 542 remains with the base 530 when the front cover 532 is removed from the base 530 to access the front side of the base 530. The internal divider 542 includes a first portion 544 (e.g., an upper portion) configured for initially separating the first and second types of transmission lines 422, 424 after the transmission lines of 422, 424 have been broken out from the jacket of the hybrid cable 426. The internal divider 542 can also include a second portion 546 for maintaining separation between the transmission lines 422, 424 after the transmission lines 422, 424 have initially been separated and as the transmission lines 422, 424 are routed to their respective first and second exit openings 432, 434.

In use, the base 530 can be secured to an external structure, and the front cover 532 can be removed from the base 530 thereby exposing the front side 534 of the base 530 and the internal divider 542. The hybrid cable 426 is preferably processed to remove/strip the outer jacket to break-out lengths of the first and second types of transmission lines 422, 424 which extend outwardly beyond an end of the outer jacket of the cable 426. With the front cover 532 removed from the base 530, the jacketed end of the cable 526 can be anchored to the base 530 at a location above the internal divider 542. The first and second transmission lines 422, 424 can then be routed across the front side of the base 530 and can be separated by the internal divider 542. Once the first and second transmission lines 422, 424 have been separated from one another by the internal divider 542, the front cover 532 can be re-attached to the base 530 to cover and protect the bifurcation location. It will be appreciated that the open rear sides 536 of the first and second exit openings 532, 534 allow the hybrid cable 526 and the first and second transmission lines 422, 424 to be pre-routed on the base 530 prior to installation of the cover 532. In other words, the open rear sides 536 allow the hybrid cable 526 and the separated transmission lines 422, 424 to be positioned in their corresponding openings 524, 526, 528 at the time the front cover 532 is installed on the base 530.

The first portion 544 of the internal divider 542 has a tapered configuration for guiding separation of the first and second transmission lines 422, 424. In the depicted example, the first portion 544 has a curved nose that preferably complies with bend-radius requirements of the transmission lines 422, 424. The second portion 546 of the internal divider 542 extends below the first portion 544 and is elongate along a length L. In certain examples, transition line guides 543 can be attached to the second portion 546 for guiding the transmission lines along separate first and second transition line paths from the divider to the respective first and second exit openings 532, 534. In certain examples, the transition line guides 543 can include fingers, loops, partial loops, brackets, bend radius limiters, projections or other structures suitable for guiding transmission lines along paths to their corresponding exit openings. In other examples, further transition line guides 543 can be attached to the base 530 at locations offset from the internal divider 542 for use in extending the transition line paths from the divider to one of the exit openings 532, 534. As shown at FIG. 23, the transition line guides 543 include a combination of guide loops/partial loops 545 and bend radius limiters 547 that cooperate to define line routing paths for routing the transmission lines 422, 424 to their corresponding exit openings 532, 534.

Figure 22:
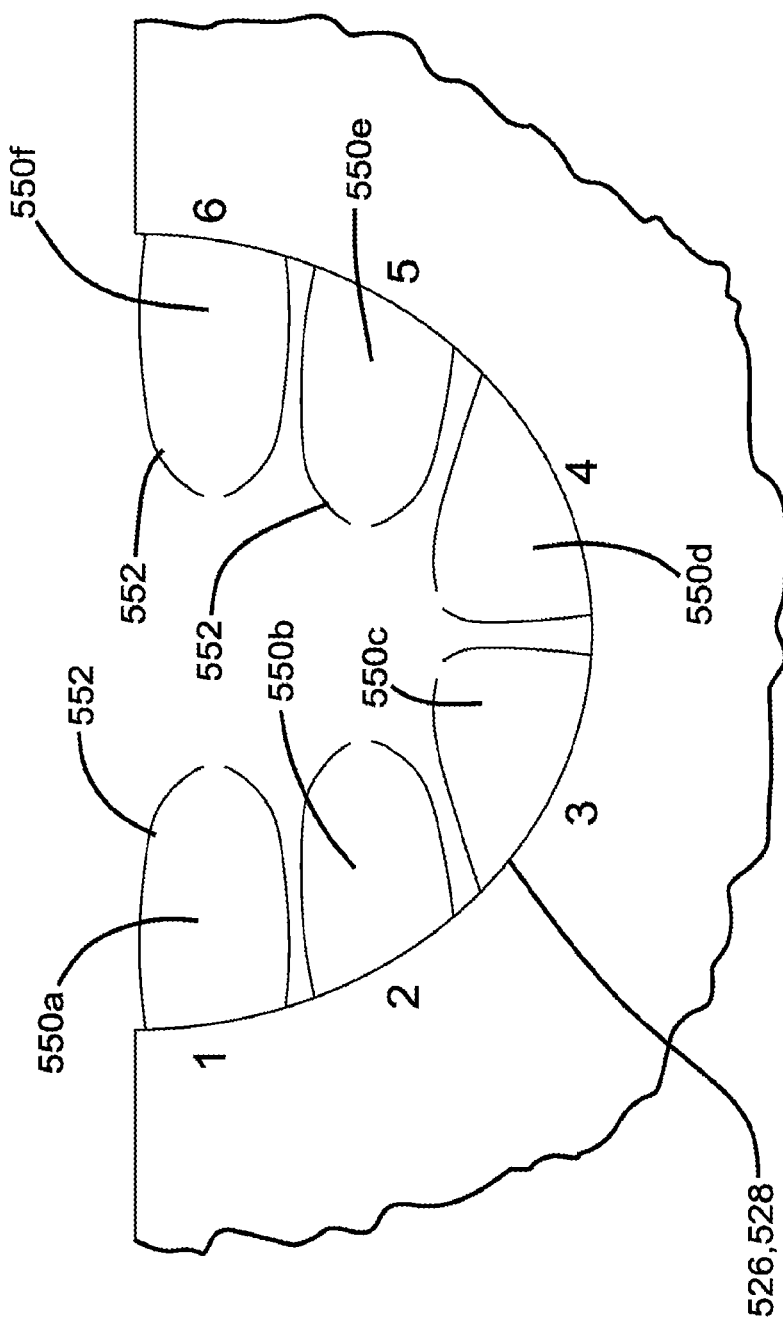
FIG. 22 shows an example configuration for subdividing transmission lines routed through separate exit openings of the enclosure of FIG. 17.

Referring to FIG. 22, the first exit opening 526 and/or the second exit opening 528 can be subdivided into separate sections 550a-f for separating the first type of transition lines 422 into smaller groups or individually at the first exit opening 526 or for separating the second type of transmission lines 424 into smaller groups or individually at the second entrance opening 528. Labeling can be provided on the housing 522 adjacent to the separate sections 550*a-f* for designating or otherwise identifying specific transmission lines of the first or second transmission lines 422, 424. Resilient fingers 552 or other types of dividers can be used to subdivide the first and second openings 526, 528.

Figure 23:
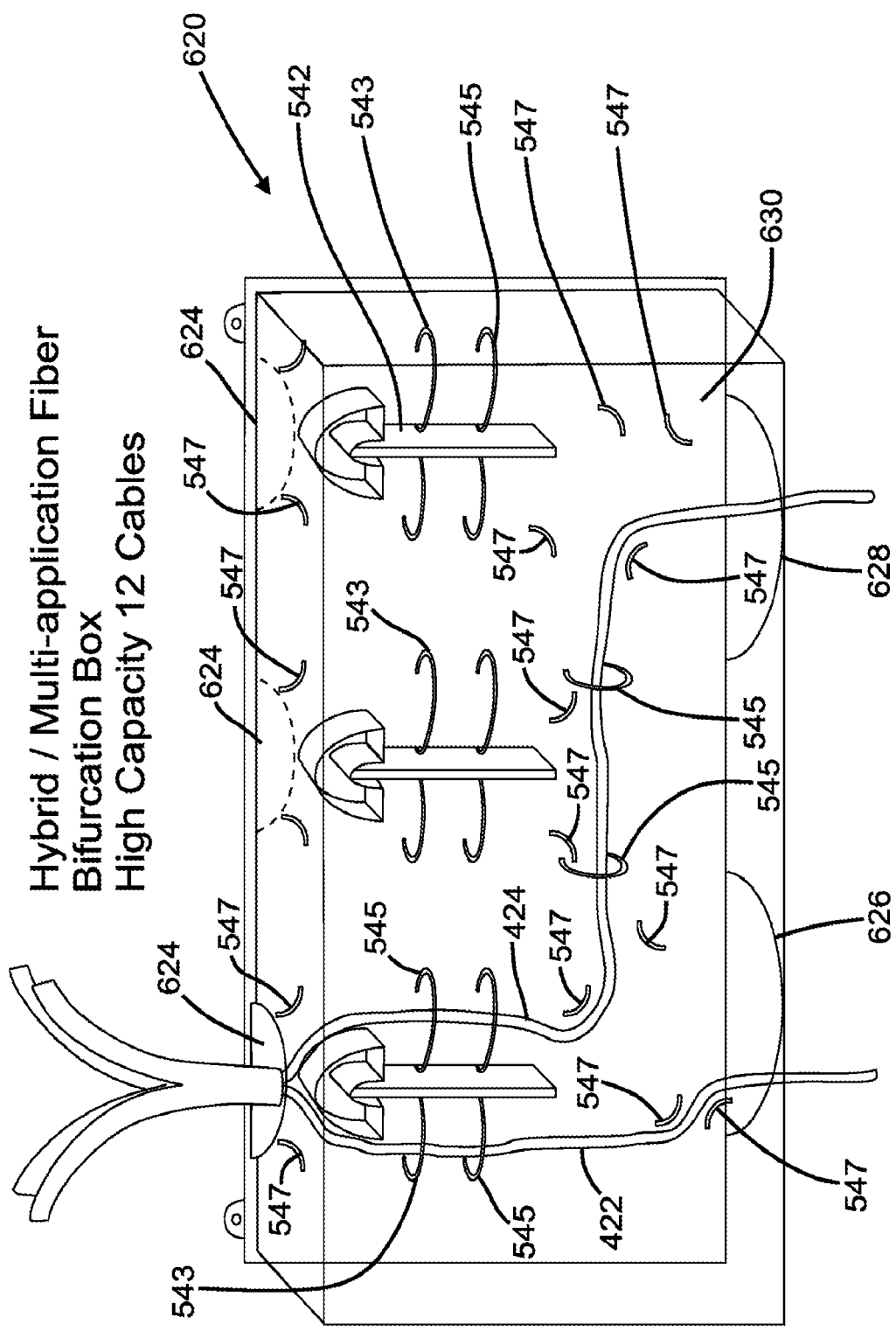
FIG. 23 shows an alternative furcation enclosure in accordance with the principles of the present disclosure having multiple entrance openings and only two exit openings.

FIG. 23 depicts another furcation enclosure 620 in accordance with the principles of the present disclosure. The enclosure 620 has a similar configuration as the enclosure 520, except multiple entrance locations 624 are provided and separate internal dividers 542 are provided for each of the entrance locations 624. Additional transmission line guides 543 are shown attached to a base 630 of the enclosure 620 below the dividers 542 for further defining transition line pathways extending to the separate first and second exit openings 626, 628. While the enclosure 620 has multiple entrance openings 624, the enclosure 620 includes only first and second exit openings 626, 628.

Figure 24:
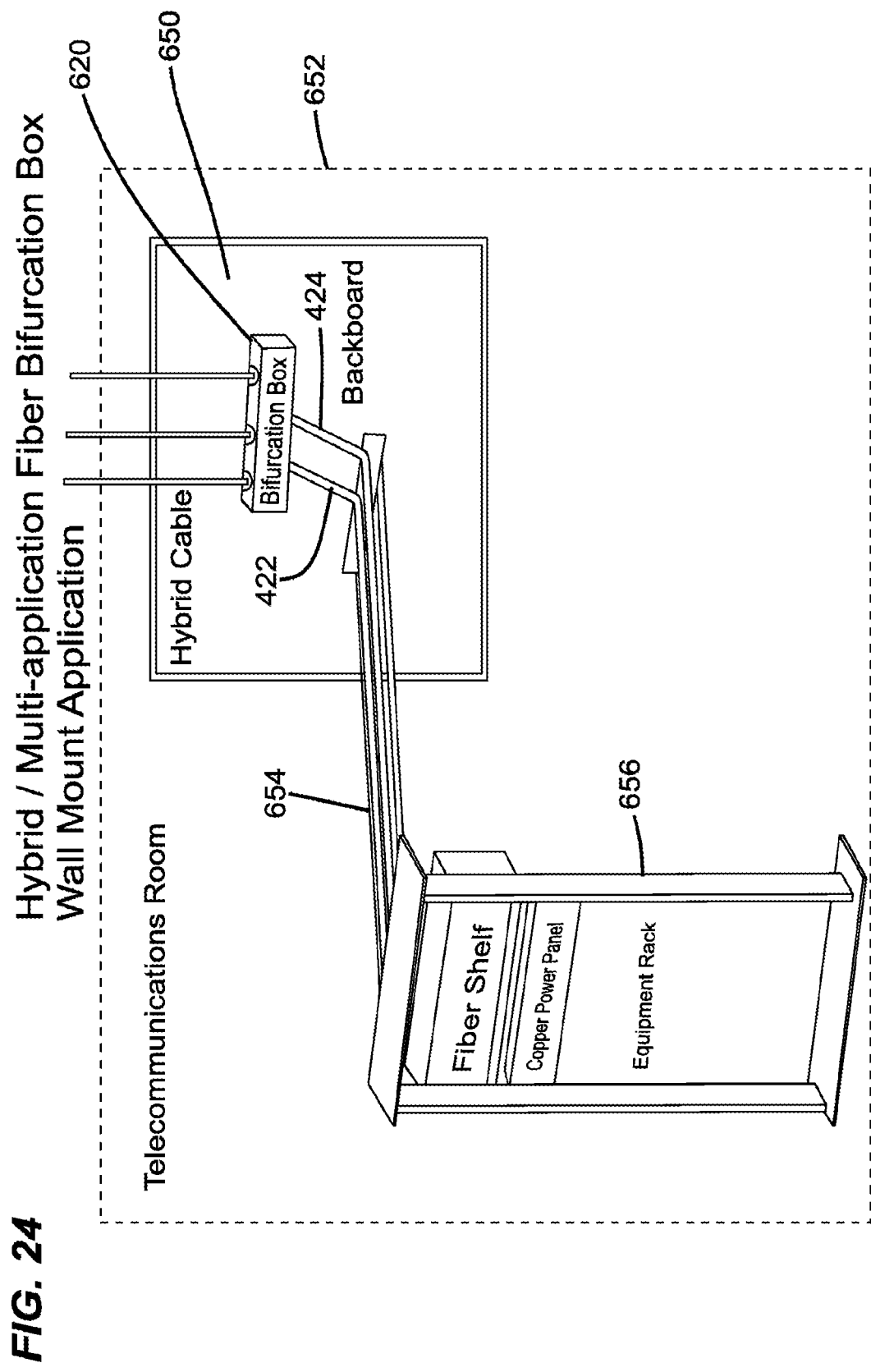
FIG. 24 shows the furcation enclosure of FIG. 23 mounted to a wall of a telecommunications room of a building, the enclosure is shown separating the transmission lines of multiple hybrid cables.
Figure 25:
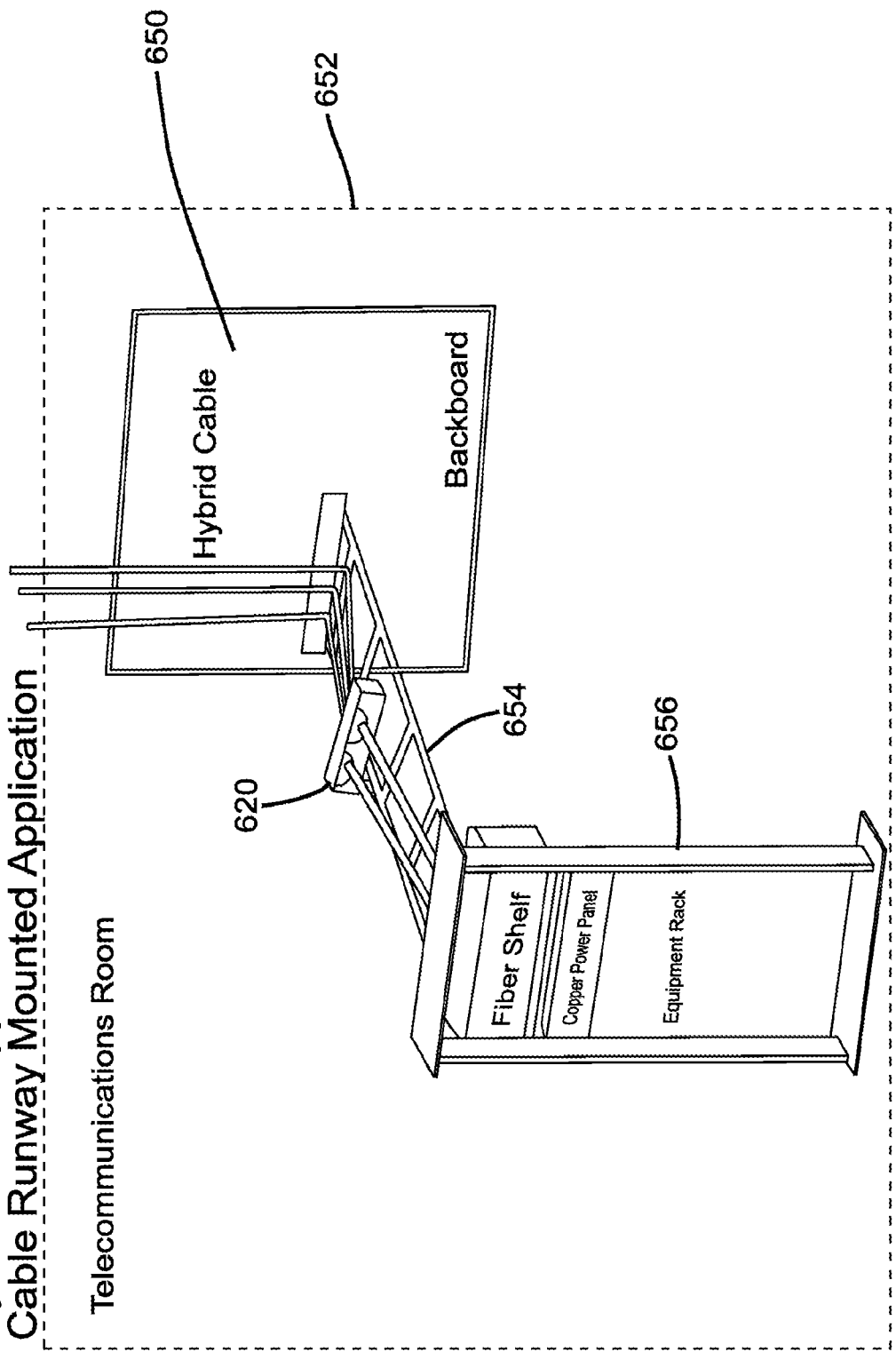
FIG. 25 shows the furcation enclosure of FIG. 23 mounted to a cable runway installed within a telecommunications room of a building, the enclosure is shown separating the transmission lines of multiple hybrid cables.
Figure 28:
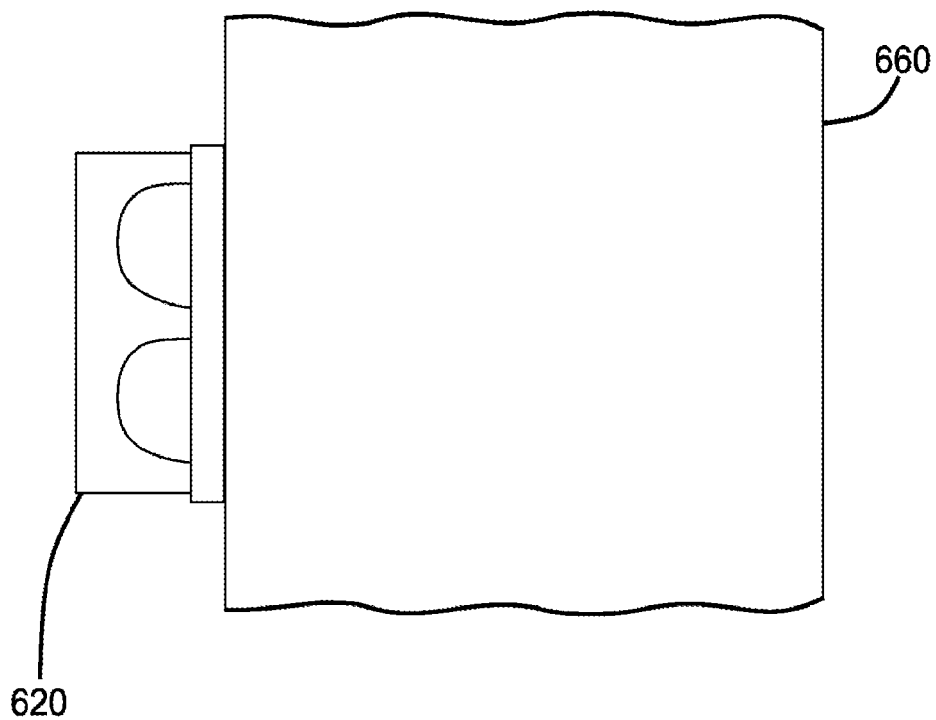
FIG. 28 is a bottom view of the enclosure of FIG. 26 shown mounted to the cable trough.
Figure 29:
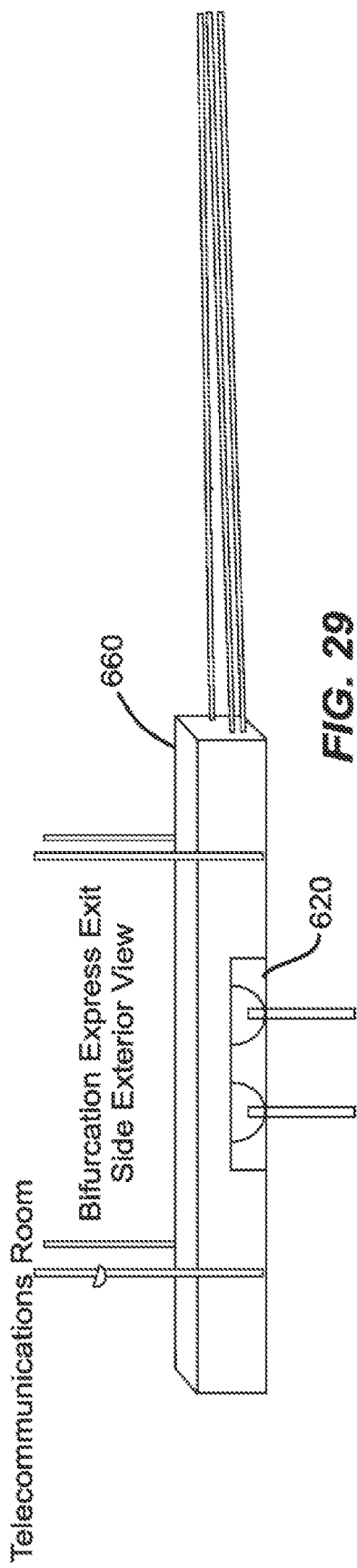
FIG. 29 is a side view of the furcation enclosure of FIG. 23 shown integrated with a side wall of a cable trough used for routing cables in a telecommunications room.
Figure 30:
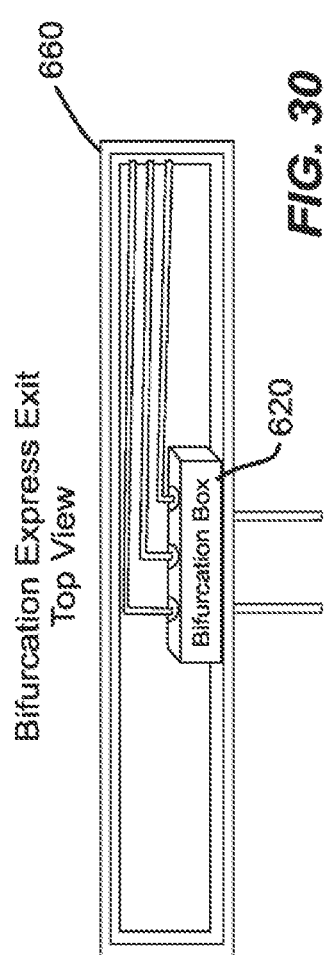
FIG. 30 is a top view of the furcation enclosure and cable trough of FIG. 29.

Enclosures in accordance with the principles of the present disclosure can be mounted within telecommunications rooms of buildings. For example, enclosures in accordance with the principles of the present disclosure can be mounted to structures such as walls, runways, cable/fiber troughs, and racks. FIG. 24 shows the enclosure 620 mounted to a wall 650 of a telecommunications room 652. The first and second transmission lines 422, 424 are shown routed from the enclosure 620 across a runway 654 to panels/shelves of an equipment rack 656. FIG. 25 shows the enclosure 620 mounted on the runway 654 instead of the wall 650. FIGS. 26-28 show the enclosure 620 mounted to a cable/fiber trough 660 via a bracket 661. It will be appreciated that hybrid cables 426 can be routed from the trough 660 into the enclosure 620 where the transmission lines 422, 424 of the cable 426 are separated from one another and then routed to separate pieces of equipment. In certain examples, the hybrid cables 426 can be routed over the edge of the trough 660 axis the enclosure 620. FIGS. 29 and 30 show the enclosure 620 integrated at a side wall of the trough 660. In certain examples, the enclosure 620 can be mounted within a notch in the side wall of the trough or in a hole in the side wall of the trough 660. In other examples, the enclosure 620 can be mounted at an exterior surface of the wall of the trough rather than an interior surface of the wall of the trough.

Aspects of the present disclosure also relate to a method for concealing and managing a furcation location of a hybrid cable 426 having first and second different types of transmission lines 422, 424. The method includes concealing the furcation location within a furcation enclosure (e.g., enclosure 520 or enclosure 620) that mounts to a structure within a telecommunications room of the building. The furcation enclosure includes an entrance opening for receiving the hybrid cable and first and second exit openings for respectively receiving the first and second different types of transmission lines. The enclosure includes an internal divider (e.g., internal divider 542) at which the first and second types of transmission lines are separated from one another to facilitate separately routing the first and second types of transmission lines to the respective first and second exit openings. In one example, furcation enclosure does not include termination functionality. In certain examples, the furcation enclosure is mounted to a wall, a rack, a trough or a runway within the telecommunications room.

What is claimed is:

1. A method for concealing and managing a furcation location of a hybrid cable having first and second different types of transmission lines, the method comprising: concealing the furcation location within a furcation enclosure that mounts to a structure within a telecommunications room of a building, the furcation enclosure including an entrance opening for receiving the hybrid cable and first and second exit openings for respectively receiving the first and second different types of transmission lines the furcation enclosure including an internal divider at which the first and second different types of transmission lines are separated from one another to facilitate separately routing the first and second different types of transmission lines to their respective first and second exit openings, the furcation enclosure not including termination functionality.

2. The method of claim 1, wherein the structure within the telecommunications room is a wall.

3. The method of claim 1, wherein the structure within the telecommunications room is a frame or a rack.

4. The method of claim 1, wherein the structure within the telecommunications room is a transmission line trough.

5. The method of claim 1, wherein the structure within the telecommunications room is a transmission line runway.

6. The method of claim 1, wherein the furcation enclosure includes a base adapted to be connected to the structure, wherein the internal divider mounts to the base, and wherein the furcation enclosure includes a front cover that removably mounts to the base and defines the entrance opening, the first exit opening and the second exit opening.

7. The method of claim 6, wherein the furcation enclosure is positioned within an inner volume of the furcation enclosure defined between the base and the front cover.

8. The method of claim 1, wherein the furcation enclosure includes transition line guides that define a first transition line path from the internal divider to the first exit opening and a second transition line path from the internal divider to the second exit opening.

9. The method of claim 1, wherein the first exit opening is further subdivided into separate sections for separating the first type of transmission lines into smaller groups or individually, and wherein the second exit opening is further subdivided into separate sections for separating the second type of transmission lines into smaller groups or individually.

10. The method of claim 9, wherein multiple hybrid cables are routed into the furcation enclosure, and wherein the first type of transmission lines are subdivided at the first exit opening based on which of the multiple hybrid cables they correspond to, and wherein the second type of transmission lines are subdivided at the second exit opening based on which of the multiple hybrid cables they correspond to.

11. A furcation enclosure comprising:
a housing including an entrance opening for receiving a hybrid cable and first and second exit openings for respectively receiving first and second different types of transmission lines broken out from the hybrid cable within the housing, the housing including a base adapted to be connected to an external structure, the housing also including a front cover that removably mounts to the base and covers a front side of the base, wherein the front cover cooperates with the base to define the entrance opening, the first exit opening and the second exit opening;
portions of the entrance opening, the first exit opening and the second exit opening defined by the front cover having open rear sides when the front cover is disconnected from the base:

an internal divider at which the first and second different types of transmission lines are separated from one another to facilitate separately routing the first and second different types of transmission lines to their respective first and second exit openings, the internal divider being provided at the front side of the base and being located within an interior of the housing when the front cover is mounted to the base.

12. The furcation enclosure of claim 11, wherein the furcation enclosure does not include termination functionality.

13. The furcation enclosure of claim 11, wherein the furcation enclosure includes transition line guides that define a first transition line path from the internal divider to the first exit opening and a second transition line path from the internal divider to the second exit opening.

14. The furcation enclosure of claim 11, wherein the first exit opening is further subdivided into separate sections for separating the first type of transmission lines into smaller groups or individually, and wherein the second exit opening is further subdivided into separate sections for separating the second type of transmission lines into smaller groups or individually.

15. The furcation enclosure of claim 11, wherein the entrance opening includes a first entrance opening and a second entrance opening, wherein the internal divider includes a first divider corresponding to the first entrance opening and a second divider corresponding to the second entrance opening, wherein the furcation enclosure includes transition line guides that define a first transition line path from the first divider to the first exit opening, a second transition line path from the divider to the second exit opening, a third transition line path from the second divider to the first exit opening, and a fourth transition line path from the second divider to the second exit opening.

* * * * *